United States Patent [19]
Doba

[11] Patent Number: 5,717,433
[45] Date of Patent: Feb. 10, 1998

[54] TOUCH SCREEN DISPLAY WITH QUICK RESPONSE AND A METHOD FOR CONTROLLING AN OBJECT IN CASE THE DISPLAY IS UNABLE TO DISPLAY A SCREEN

[75] Inventor: Eiji Doba, Komatsu, Japan

[73] Assignee: Komatsu, Ltd., Tokyo, Japan

[21] Appl. No.: 424,599

[22] Filed: Apr. 17, 1995

Related U.S. Application Data

[63] Continuation of Ser. No. 17,530, Feb. 16, 1993, abandoned.

[30] Foreign Application Priority Data

| Feb. 17, 1992 | [JP] | Japan | 4-029408 |
| May 14, 1992 | [JP] | Japan | 4-121491 |
| May 28, 1992 | [JP] | Japan | 4-137270 |

[51] Int. Cl.$^6$ .................................. G09G 5/00
[52] U.S. Cl. ............... 345/173; 345/904; 399/11
[58] Field of Search .................. 345/173, 156, 345/169, 180, 182, 901, 902, 119, 120, 195, 904; 178/18, 19; 355/200, 204, 209, 59; 340/525; 101/DIG. 47; 364/188, 181, 189, 474.26, 476; 72/7, 31, 35; 399/11, 81

[56] References Cited

U.S. PATENT DOCUMENTS

| 4,724,462 | 2/1988 | Yamasaki et al. | 399/81 |
| 4,763,356 | 8/1988 | Day, Jr. et al. | 178/18 |
| 5,170,397 | 12/1992 | Hurtz et al. | 399/11 |
| 5,224,053 | 6/1993 | Cook | 364/188 |
| 5,278,611 | 1/1994 | Ito et al. | 355/209 |

FOREIGN PATENT DOCUMENTS

| 62-192849 | 12/1987 | Japan | B23Q 17/00 |

OTHER PUBLICATIONS

Japanese Publication 62-236298 (A).
Japanese Publication 61-101807 (A).
Japanese Publication 62-192801 (A).
Japanese Publication 62-200401 (A).
Japanese Publication 63-148323 (A).
Japanese Publication 63-187325 (A).
Japanese Publication 1-240905 (A).
Japanese Publication 1-286013 (A).
Japanese Publication 2-108102 (A).
Japanese Publication 3-127223 (A).

*Primary Examiner*—Chanh Nguyen
*Attorney, Agent, or Firm*—Senniger, Powers, Leavitt, & Roedel

[57] ABSTRACT

A touch screen display having a display surface composed of a touch screen, on which screens can be selectively displayed by touching the touch screen in an interactive manner. The touch screen display does not take time in executing a program and ensures high display response performance. A location specified by a touch on the display surface of a plasma display is detected in a touch detecting circuit by detecting a mesh number which is allocated to each of mesh regions into which the whole display surface is divided by a virtual mesh. By a switch filter, when the detected mesh number corresponds to other locations than those of control instruction indicia each displayed in the form of an operation button on the screen displayed on the display surface, the mesh number is invalidated. On the other hand, when the mesh number corresponds to the location of any one of the control instruction indicia, the mesh number is validated. The control instruction indicium selected by a touch is identified by the switch filter for assigning a switch number corresponding to the selected control instruction indicium to the mesh number, whereby a desired screen switching process can be accomplished.

28 Claims, 16 Drawing Sheets

FIG.10B

| 16 | 15 |   |   |   |   |   |   |   |   |   | 4 | 3 | 2 | 1 |
|----|----|---|---|---|---|---|---|---|---|---|---|---|---|---|
| 32 |    |   |   |   |   |   |   |   |   |   |   |   |   | 17 |
|    |    |   |   |   |   |   |   |   |   |   |   |   |   | 33 |
| 64 |    |   |   |   |   |   |   |   |   |   |   |   | 50 | 49 |
| 80 |    | 77 | 76 |   |   |   |   |   | 69 | 68 |   |   |    | 65 |
|    |    |   |   |   |   |   |   |   |   |   |   |   |    | 81 |
|    |    |   |   |   |   |   |   |   |   |   |   |   |    | 97 |
|    |    |   |   |   |   |   |   |   |   |   |   |   |    | 113 |
| 144 |   | 140 | 139 |   |   |   |   |   |   |   |   |   |    | 129 |
| 160 | 159 | 156 | 155 |   |   |   |   |   |   |   |   |   | 146 | 145 |

FIG.10C

| $R_{16}$ | $R_{15}$ |   |   |   |   |   |   |   |   |   | $R_4$ | $R_3$ | $R_2$ | $R_1$ |
|----|----|---|---|---|---|---|---|---|---|---|---|---|---|---|
| $R_{32}$ |  |   |   |   |   |   |   |   |   |   |   |   |   | $R_{17}$ |
|    |    |   |   |   |   |   |   |   |   |   |   |   |   | $R_{33}$ |
| $R_{64}$ |  |   |   |   |   |   |   |   |   |   |   |   | $R_{50}$ | $R_{49}$ |
| $R_{80}$ |  | $R_{77}$ | $R_{76}$ |   |   |   |   |   | $R_{69}$ | $R_{68}$ |   |   |    | $R_{65}$ |
|    |    |   |   |   |   |   |   |   |   |   |   |   |    | $R_{81}$ |
|    |    |   |   |   |   |   |   |   |   |   |   |   |    | $R_{97}$ |
|    |    |   |   |   |   |   |   |   |   |   |   |   |    | $R_{113}$ |
| $R_{144}$ |  | $R_{140}$ | $R_{139}$ |   |   |   |   |   |   |   |   |   |    | $R_{129}$ |
| $R_{160}$ | $R_{159}$ | $R_{156}$ | $R_{155}$ |   |   |   |   |   |   |   |   |   | $R_{146}$ | $R_{145}$ |

FIG.11A
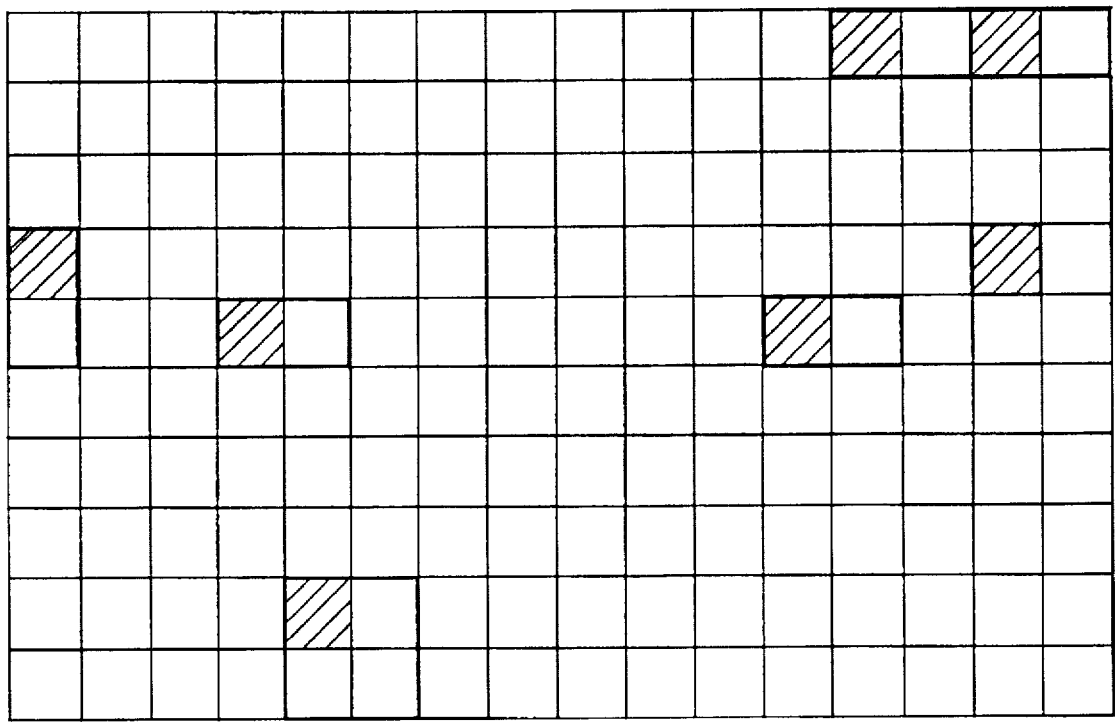
FIG.11B
| SWITCH PATTERN | TOUCH SWITCH NUMBER |
|---|---|
FIG.12A     FIG.12B     FIG.12C     FIG.12D
               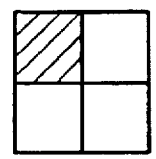

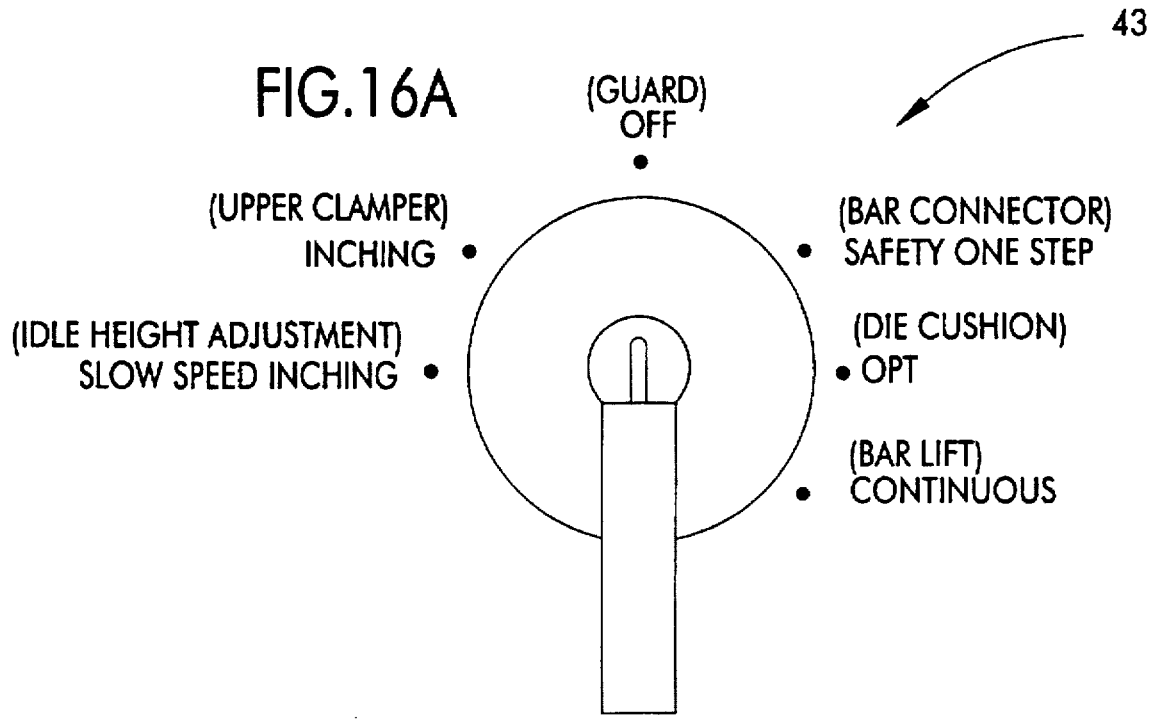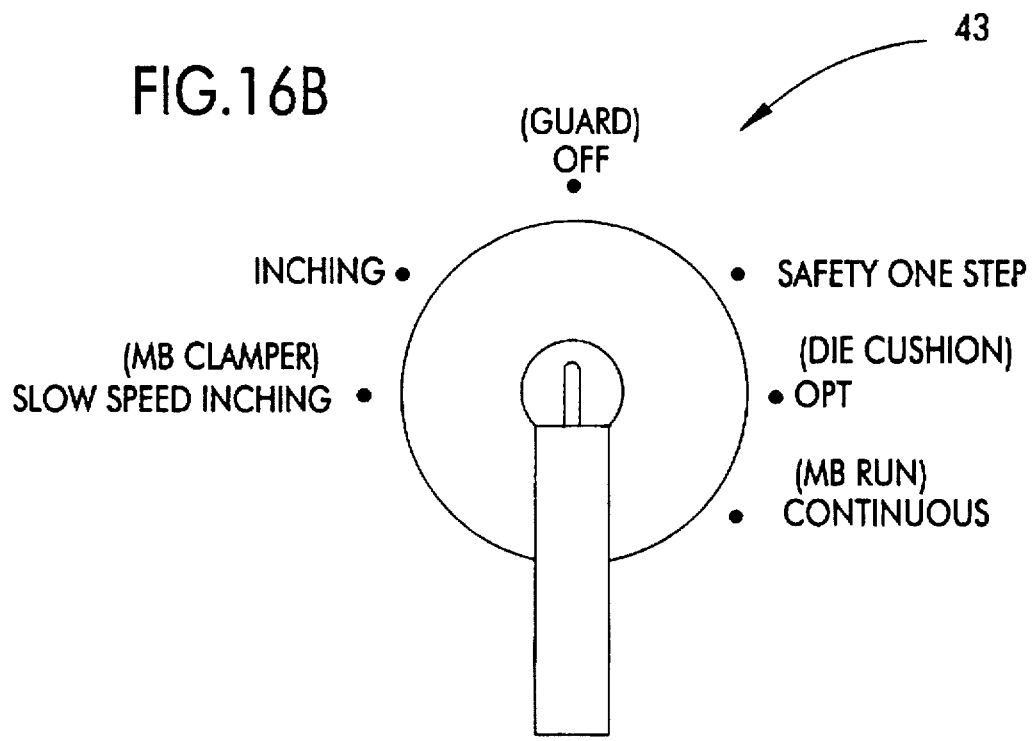

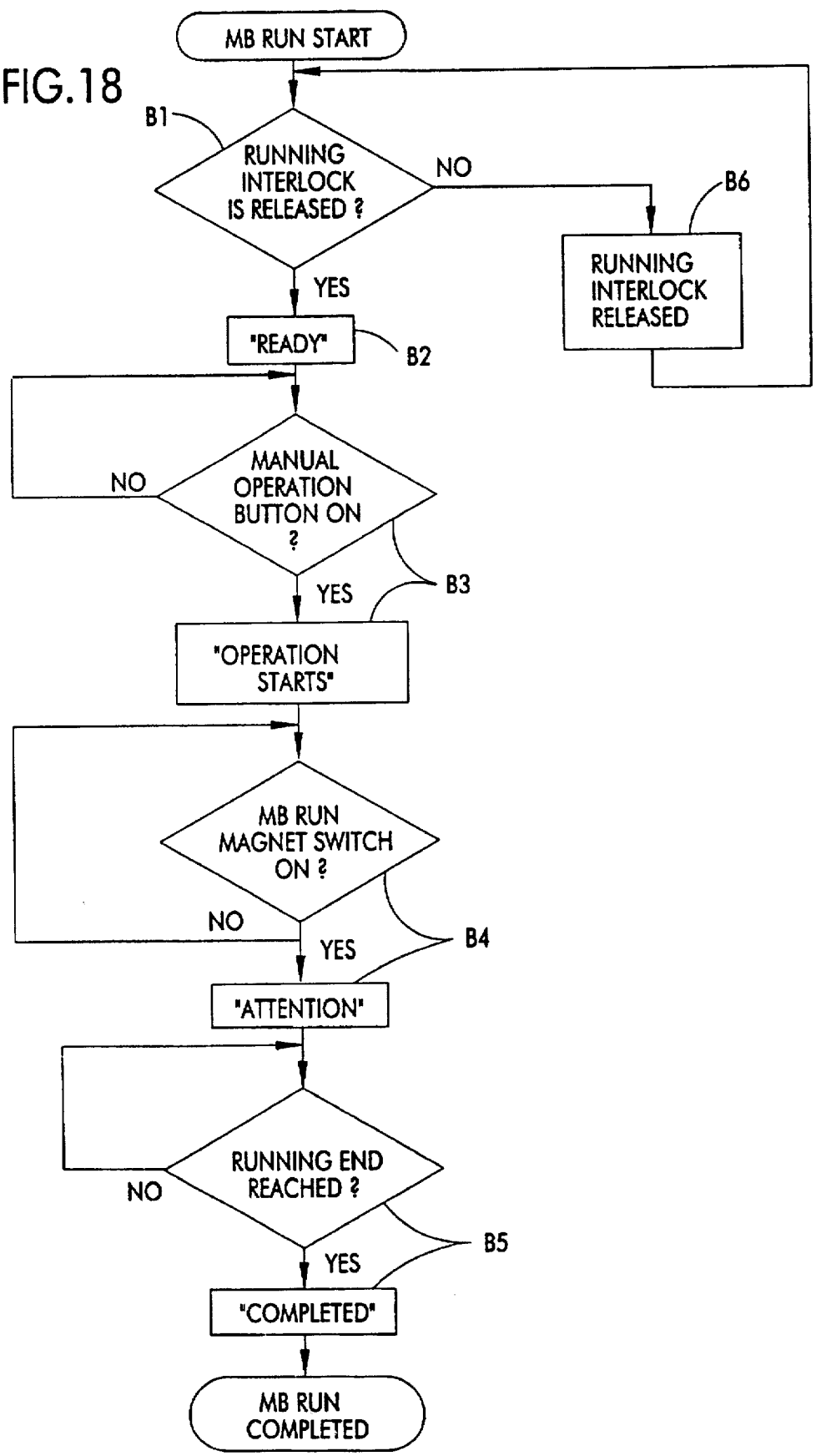

TOUCH SCREEN DISPLAY WITH QUICK RESPONSE AND A METHOD FOR CONTROLLING AN OBJECT IN CASE THE DISPLAY IS UNABLE TO DISPLAY A SCREEN

This is a continuation of application Ser. No. 08/017,530 filed on Feb. 16, 1993, now abandoned.

BACKGROUND OF THE INVENTION

1. Field of the Invention

The present invention relates to a touch screen display which is particularly well adapted for use in a machine tool such as a press or a numerical controlled machine tool in order to perform its control operation, and wherein a display surface is composed of a touch screen and a screen switching process for switching one screen currently displayed to another screen is performed in an interactive manner by touching the touch screen of the display surface, in other words, by touching a screen displayed on the display surface.

2. Description of the Prior Art

In recent years, the computerization of machine tools is advancing as their functions become increasingly diversified. In order to rapidly, easily perform operation processes with high accuracy to fulfill the diversified functions, such touch screen displays as mentioned above are more and more employed.

In a touch screen display, switching between screens is executed as follows.

The whole display surface composed of a touch screen is divided into mesh regions with a virtual mesh and a mesh identification mark (e.g., a mesh number) is allocated to each mesh region. With a mesh number detected, a location "touched" on a currently displayed screen can be identified. Suppose that a currently displayed screen now displays the indicia of, for instance, a plurality of control instructions by each of which the currently displayed screen can be switched to another specified screen.

The mesh number detected is directly compared with the contents of the currently displayed screen in order to sequentially judge whether or not the detected mesh number corresponds to each control instruction indicium displayed on the screen, whereby the control instruction indicium which has been selected by a touch is identified. In accordance with the control instruction indicium thus identified, the currently displayed screen is switched to a specified screen.

SUMMARY OF THE INVENTION

The above-described method for identifying a control instruction indicium which has been selected by a touch through a direct comparison between the mesh number and the contents of the currently displayed screen, however, takes time in executing a program and therefore has a problem in the display response.

One proposal to rapidly, easily execute operation processes with high accuracy in a machine tool having diversified functions is that, apart from the screen switching process executed by touching a screen, the number of manual operation switches employed is reduced by giving a plurality of control instructing functions to one manual operation press button in the following manner.

Specifically, each time a screen displayed is switched to another screen by touching the screen, a control instructing function given to the manual operation button is renewed in accordance with control instructions for controlled objects displayed on the newly selected screen.

The above proposal in which the new control instructing function is given to the manual operation button each time switching between screens is executed, however, has a problem in that when a screen cannot be displayed on the display surface because of the occurrence of a trouble, each controlled object cannot be operated until the malfunction in the display device etc. of the touch screen display is eliminated, even though the driving mechanism for the control object is in a normal operative condition.

In order to overcome the above problems, one of the objects of the invention is to provide a touch screen display which does not require much time in executing programs, therefore, exerting superior display response.

Another object of the invention is to provide a touch screen display capable of sending a control instruction to a driving mechanism for a controlled object so as to operate the object, even when a screen cannot be displayed on the display surface because of the occurrence of a trouble.

According to the first aspect of the invention, there is provided a touch screen display comprising, as shown in the block diagram of the principle of the invention of FIG. 1:

(a) displaying means (1) comprising a display surface which is composed of a touch screen and entirely divided into mesh regions with a virtual mesh and on which screens can be selectively displayed, each of said selectable screens displaying at least one control instruction indicium by which a screen currently displayed is switched to another specified screen, said control instruction indicium being so arranged to correspond to the mesh regions defined by the virtual mesh on the display surface;

(b) first memory means (2) for storing display screen data for each of the screens to be selectively displayed on the display surface of the displaying means (1);

(c) touched location detecting means (3) for detecting a touched location specified by a touch on the touch screen of the display surface of the displaying means (1), by detecting a mesh identification mark allocated to each of the mesh regions defined by the virtual mesh on the entire display surface;

(d) second memory means (4) for storing filter data for each of the selectable screens to be displayed on the display surface of the displaying means (1), said filter data being used for invalidating the mesh identification mark detected by the touched location detecting means (3) when it corresponds to an other location than the location of the control instruction indicium respectively displayed on each selectable screen on the display surface of the displaying means (1) as to correspond to the mesh regions defined by the virtual mesh on the entire display surface, or validating the mesh identification mark when it corresponds to the location of the control instruction indicium and assigning a process identification mark of the corresponding control instruction indicium to the validated mesh identification mark;

(e) third memory means (5) for storing display control algorithms each corresponding to each process identification mark that is to be assigned in accordance with the filter data for each screen and is stored in the second memory means (4);

(f) process identification mark assigning means (6) for assigning the process identification mark to the mesh identification mark which has been detected by the touched location detecting means (3), by the use of the filter data corresponding to a screen currently displayed on the display surface of the displaying means (1) and stored in the second memory means (4);

(g) screen command generating means (7) for generating a screen command for instructing displaying of a specified screen, by processing the display control algorithm that corresponds to the process identification mark assigned by the process identification mark assigning means (6) and is stored in the third memory means (5); and (h) display control means (8) for displaying a specified screen on the display surface of the displaying means (1) according to the display screen data corresponding to the specified screen and stored in the first memory means (2), in response to the screen command generated by the screen command generating means (7).

Unlike the prior art, the invention described above does not identify a control instruction indicium which has been specified by a touch, by directly checking and comparing a detected mesh identification mark with the contents of a currently displayed screen. According to the invention, a control instruction indicium selected by a touch is identified by the use of filter data which invalidate and eliminate a detected mesh identification mark when it corresponds to an other location(s) than the location(s) of the control instruction indicium(-a) displayed, and validate the mesh identification mark, assigning the process identification mark of the corresponding control instruction indicium thereto when it corresponds to the location of (any one of) the control instruction indicium(-a).

Accordingly, the filter data in the above arrangement allow an detected mesh identification mark corresponding to none of the control instruction indicia to be simply eliminated and allow an detected mesh identification mark corresponding to an (any) control instruction indicium to be assigned with the process identification mark of its corresponding control instruction indicium. Therefore, the touch screen display of the invention has an advantage over the prior art, since it does not take much time in executing a program and ensures superior display response.

The above screen may be a base screen or a window screen in which at least one window is overlapped on the base screen. The above mesh identification marks may be mesh numbers, and when the whole display surface is divided by an n×m virtual mesh, the mesh numbers are from 1 to n×m. The process identification marks may be switch numbers allocated to control instruction indicia each taking the form of an operation button.

The above filter data for each screen may comprise a switch development flag block and a switch number block. Basically, a switch development flag in the switch development flag block may be set to "0" in order to invalidate the mesh number when it corresponds to an other location(s) than the location(s) of the control instruction indicium(-a) and set to "1" in order to validate the mesh number when it corresponds to the location of the control instruction indicium(-a).

Preferably, the above display control algorithms are prepared by an external device and stored in the third memory means (5), which facilitates the alteration of the display control algorithms.

The above means (1) to (8) are preferably arranged as follows.

The displaying means (1), the first memory means (2), the touched location detecting means (3), the second memory means (4), the process identification mark assigning means (6) and the display control means (8) are provided at a display section, whilst the third memory means (5) and the screen command generating means (7) are provided at a control section, and the process identification marks and the screen commands are transmitted between the display section and the control section.

An alternative arrangement is such that the displaying means (1), the first memory means (2), the touched location detecting means (3) and the display control means (8) are provided at a display section, whilst the second memory means (4), the third memory means (5), the process identification mark assigning means (6) and the screen command generating means (7) are provided at a control section, and the mesh identification marks and the screen commands are transmitted between the display section and the control section.

These arrangements reduce the amount of information transmitted between the display section and the control section so that the display response can be further improved.

According to the second aspect of the invention, there is provided a touch screen display comprising, as shown in the block diagram of the principle of the invention of FIG. 2:

(a) displaying means (1') comprising a display surface composed of a touch screen on which screens can be selectively displayed, wherein switching from one screen to another specified screen is executed by touching the touch screen of the display surface;

(b) at least one control instruction switching means (9) disposed on a side of the display surface of the displaying means (1'), to which a new control instructing function is given each time one screen is switched to another, in accordance with a control instruction for a controlled object displayed on the new screen on the display surface;

(c) emergency operation mode switching means (10) for switching from a normal operation mode to an emergency operation mode at least when the displaying means (1') is an abnormal condition so that a screen cannot be displayed on its display surface; and (d) selector switching means (11) for giving a control instructing function to the control instruction switching means (9), said control instructing function corresponding to a control instruction for a controlled object selected from control instructions for controlled objects which are set when the normal operation mode is switched to the emergency operation mode by the emergency mode switching means (10).

According to the invention described above, when the displaying means (1') is at least in an abnormal condition so that a screen cannot be displayed on its display surface, the operation mode is switched from the normal operation mode to the emergency operation mode by the emergency operation mode switching means (10), and control instructions for controlled objects are set in the selector switching means (11). From the control instructions for controlled objects thus set, a desired control instruction for a controlled object is selected by the selector switching means (1), and a control instructing function corresponding to the selected control instruction is given to the control instruction switching means (9).

The above arrangement enables it to give a desired control instruction to a driving mechanism for a specified controlled object so as to operate the specified object, even when a screen cannot be displayed on the display surface because of the occurrence of a trouble.

Preferably, informing means is provided in order to inform the progress of control operation being performed on a controlled object visually or by means of sound when the control operation is started by the control instruction switching means (9), at least when the displaying means (11') is in the above abnormal condition. With this arrangement, the progress of control operation performed on a controlled object can be confirmed, thereby facilitating the control operation.

Preferably, there are provided two control instruction switching means (9) to which opposite control instructing functions are given respectively. These opposite control instructing functions correspond to opposite instructions for a specified controlled object. Further, it is preferable that the control instruction switching means (9) is a manual operation button and two manual operation buttons are disposed laterally on a side of the display surface of the displaying means (1'). It is also preferable that in accordance with the opposite control instructing functions respectively given to the two manual operation buttons, control instructions are displayed, in corresponding locations to the manual operation buttons on a screen displayed on the display surface of the displaying means (1'). The opposite control instructing functions given to the control instruction switching means (9) for instructing opposite control instructions to a specified controlled object are, for example, lifting/lowering instructing functions for a guard, or clamping/unclamping instructing functions for a moving bolster clamper.

Preferably, switching from the normal operation mode to the emergency operation mode by the emergency operation mode switching means (10) is executed by inserting an emergency operation card into the touch screen display. This card stores control instructions for controlled objects to be set in the selector switching means (11). In other words, control instructions are set in the selector switching means (11) based on the control instructions stored in the emergency operation card. A plurality of kinds of emergency operation cards are preferably used for setting different control instructions for controlled objects in the selector switching means (11).

The first memory means (2) and the emergency operation card may be a ROM card such as an IC card, and the selector switching means (11) may be a selector capable of selecting various driving modes when the touch screen display is in the normal operation mode.

These and other objects and novel features of the invention will become more apparent in the following detailed description. While the following description and embodiment represent the preferred forms of the present invention, it will be obvious to those skilled in the art that various changes and modifications may be made without departing from the spirit of the invention.

BRIEF DESCRIPTION OF THE DRAWINGS

For a fuller understanding of the nature and advantages of the invention, reference should be made to the ensuing detailed description taken in conjunction with the accompanying drawings which are not intended as a definition of the limits of the invention.

FIGS. 3 to 18 are for explaining an embodiment in which a touch screen display according to the invention is applied to a crank press;

FIG. 3 is a front view of a main operating panel of the press;

FIG. 4 is a view showing a base screen "production monitor A";

FIG. 5 is a view showing a window screen "guard operation";

FIG. 6 is an enlarged front view of a driving-mode selector;

FIG. 7 is a front view of a portable operating panel;

FIG. 8 is a block diagram showing an outline of the entire structure of the press;

FIG. 9 is a block circuit diagram showing a screen display control process in a display unit and a programmable controller;

FIG. 10(B) shows a whole display surface divided with a virtual mesh;

FIG. 10(C) shows an arrangement of a switch filter;

FIG. 11(A) shows an arrangement of a switch development flag block;

FIG. 11(B) shows an arrangement of switch number block;

FIGS. 12(A) to 12(D) are diagrams each showing a switch pattern;

FIG. 13 shows an arrangement of a display control algorithm;

FIG. 14 illustrates a method for obtaining the display control algorithm from a switch number;

FIG. 15 is a flow chart illustrating an emergency operation mode switching control wherein a normal operation mode is switched to an emergency operation mode using an emergency operation card;

FIGS. 16(A) and 16(B) show control instructions for controlled objects set in the driving-mode selector in accordance with emergency operation cards I an II.

FIG. 18 is a flow chart of a running control for a moving bolster at the time of the emergency operation mode.

DESCRIPTION OF THE PREFERRED EMBODIMENTS

A concrete embodiment of a touch screen display according to the invention will be hereinafter described with reference to the drawings.

Figure 1:
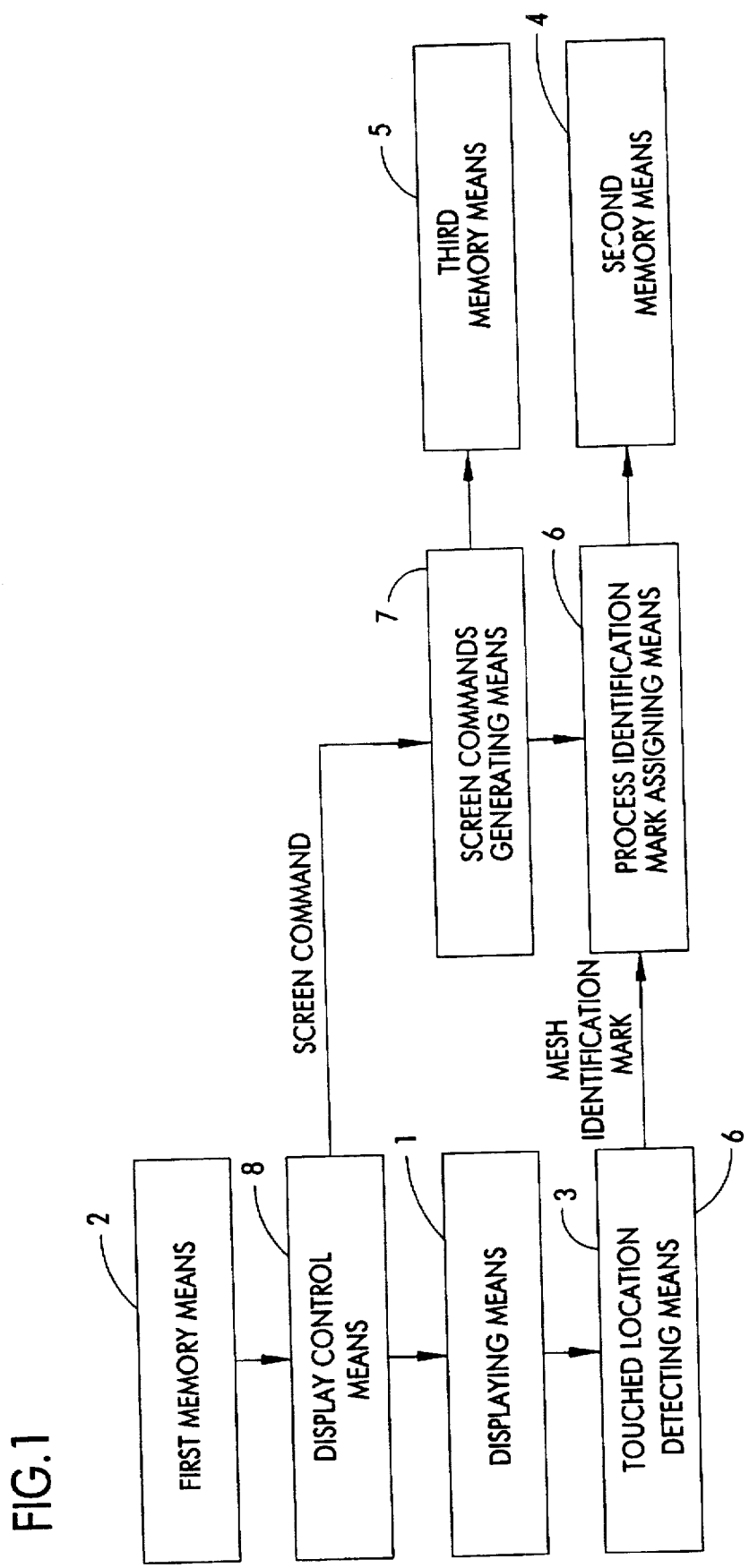
FIG. 1 is a block diagram showing the principle of a touch screen display according to a first aspect of the invention.
Figure 2:
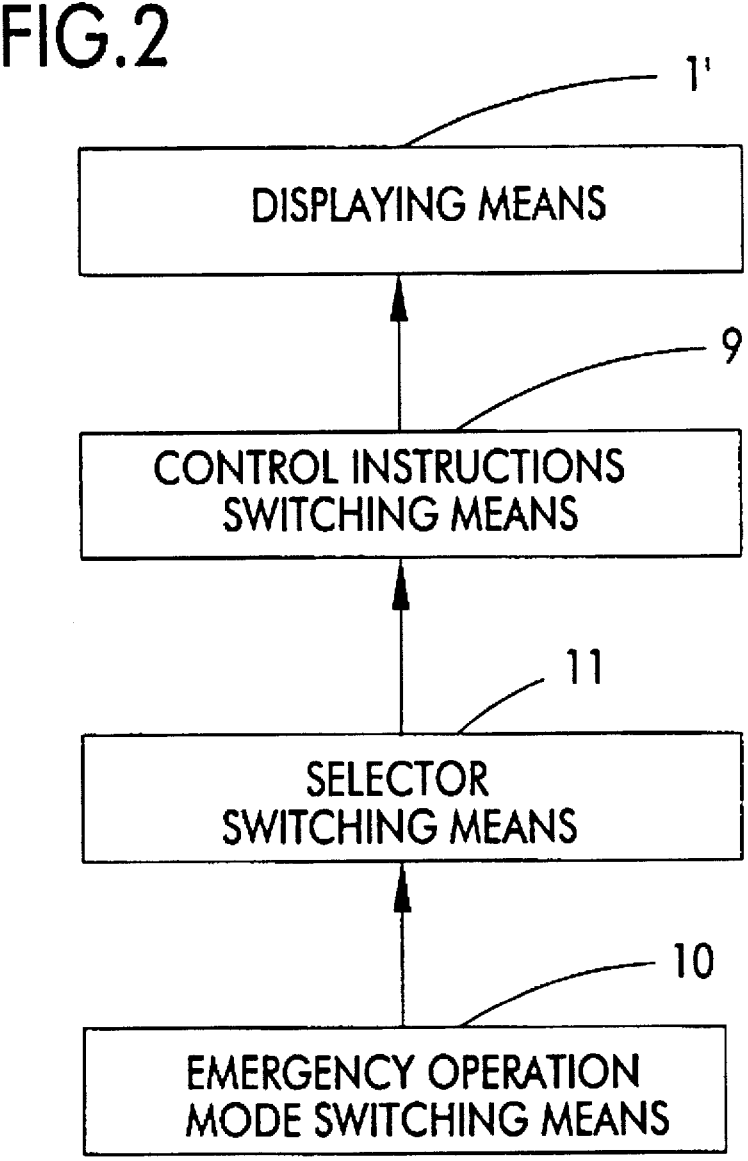
FIG. 2 is a block diagram showing the principle of a touch screen display according to a second aspect of the invention.
Figure 3:
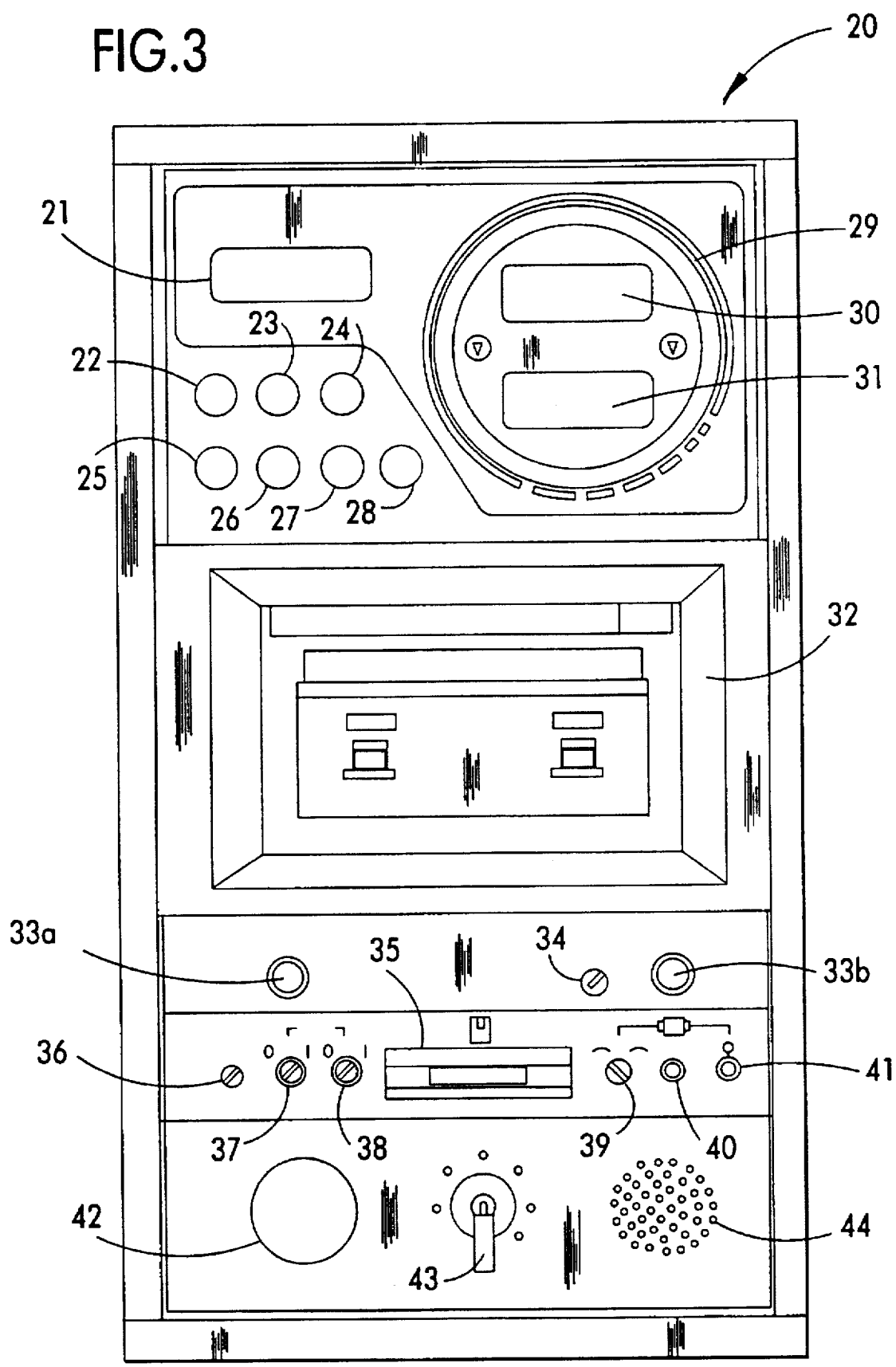

Referring to FIG. 3 that shows a front view of a main operating panel 20 of a crank press to which a touch screen display according to the invention is applied, the upper left position of the panel 20 is provided with an LED speed display 21 for displaying a pressing speed in a digital value composed of three digits. Provided under the LED speed display 21 are an overload display 22 that is lit when the press is overloaded, an emergency stop display 23 that is lit when the press is in an emergency stop condition, a safety device operation display 24 that is lit when a laser safety device is in operation, a balancer pressure condition display 25 that is lit when a balancer pressure is normal, a lubrication condition display 26 that is lit when the lubrication system is in a normal condition, a main motor starting display 27 that is lit when a main motor starts its operation, and a preparation completion display 28 that is lit when the press is ready for operation, in this order. At the upper right of the panel 20, there is provided a roulette-type crank angle display 29 for displaying the crank angle of the press with a laser emitting diode. This roulette-type crank angle display 29 is capable of displaying from 0° to 360° and graduated in 10° divisions. Inside the roulette-type crank angle display 29 is an LED angle display 30 for displaying the angle of a crank in a digital value composed of three digits. Under the LED angle display 30 is a height display 31 for displaying the height of the crank from its lower dead point in mm.

Figure 4:
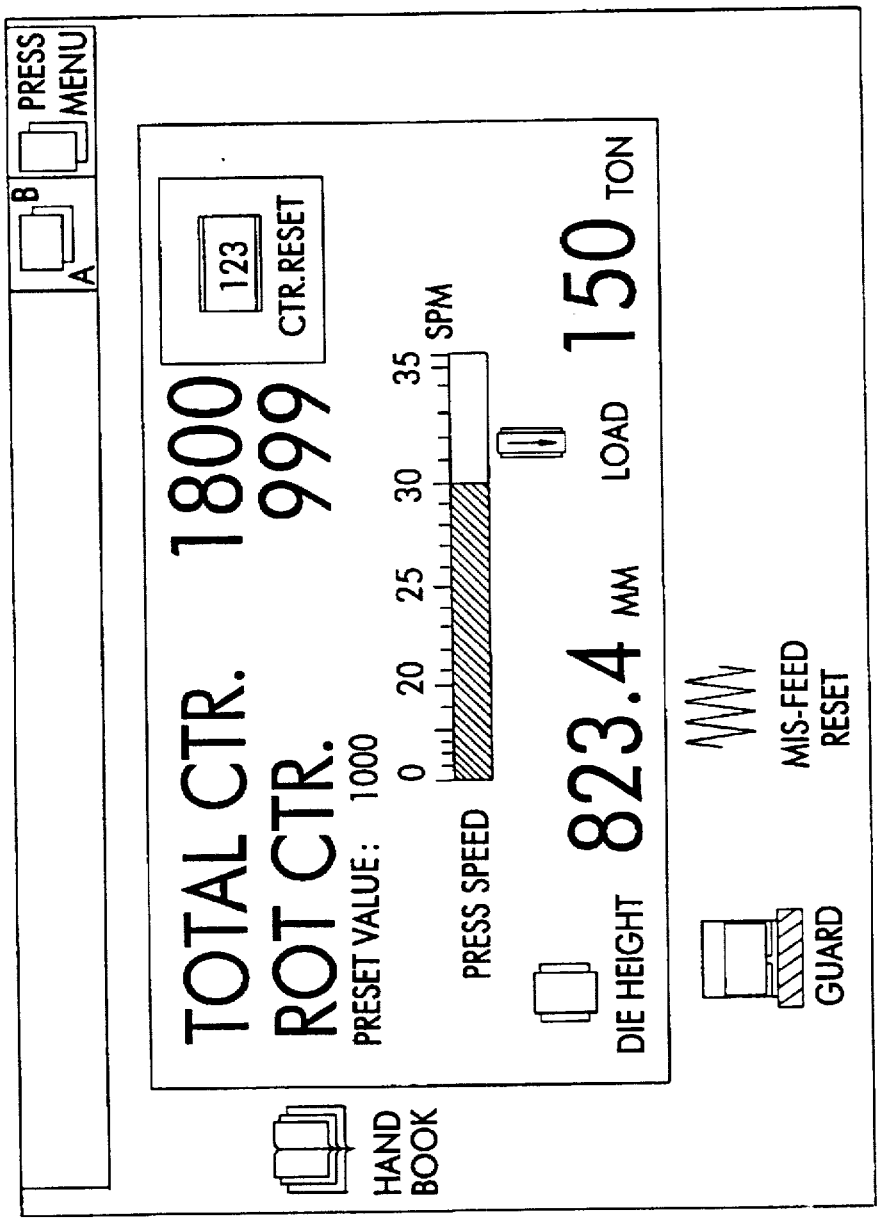

The centre of the main operating panel 20 is provided with a plasma display 32 whose display surface is composed of a touch screen and divided into mesh regions by a virtual mesh all over. On the display surface of the plasma display 32, selectable screens can be displayed, and in FIG. 3, a window screen "guard operation" is displayed on this display surface. Switching from one screen to another specified screen on the plasma display 32 is executed by touching the touch screen of its display surface, more concretely, by touching one of the control instruction indicia displayed on a screen displayed on the display surface. These control instruction indicia used for switching screens are each arranged in the form of an operation button and disposed so as to correspond to the mesh regions defined by the virtual mesh. For example, in a base screen "production monitor A" shown in FIG. 4, the control instruction indicia are (1)

Figure 5:
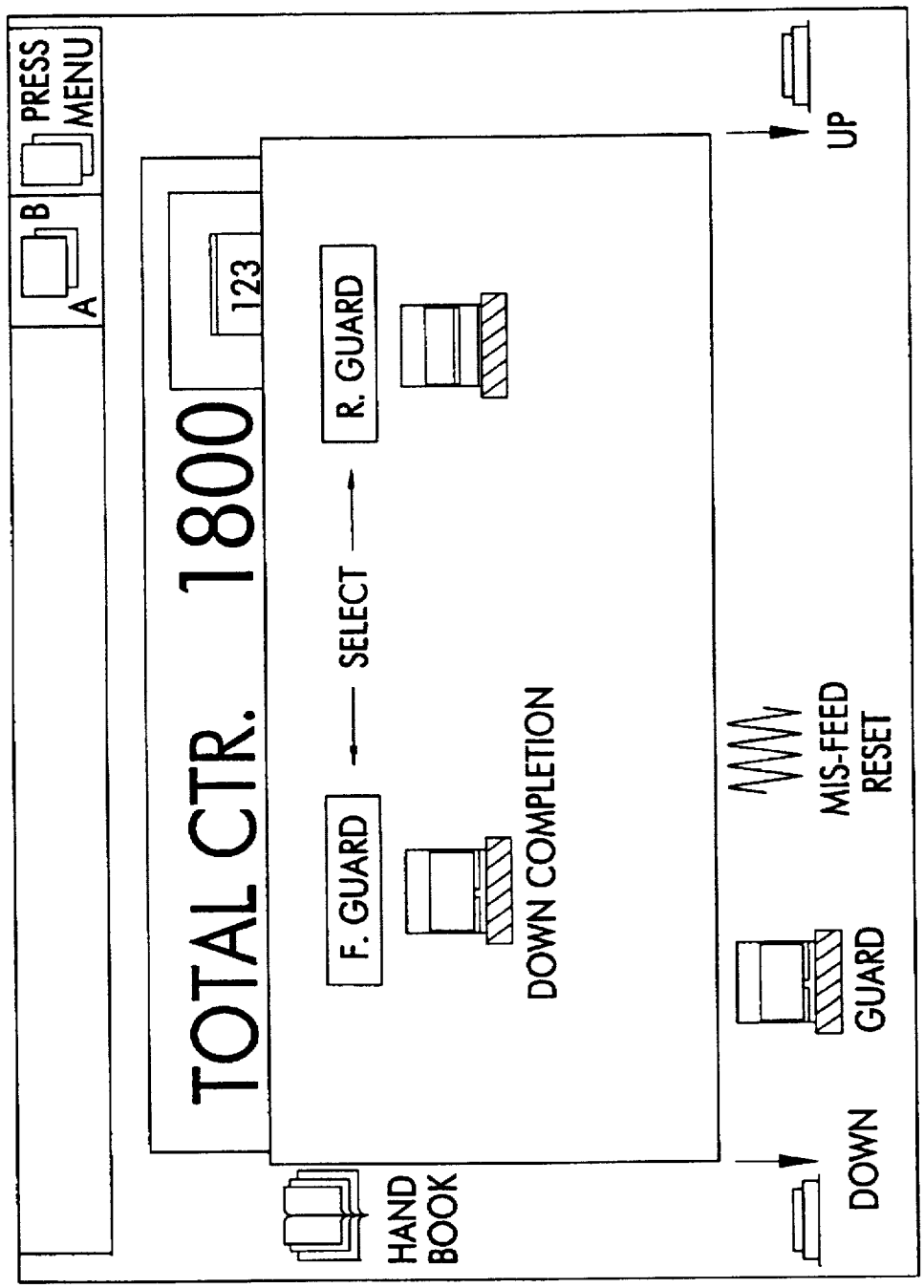

"A  B"

for switching between the base screen "production monitor A" and the base screen "setting monitor B", (2) "press menu" for switching to a "menu screen", (3) "hand book" for switching to a "help screen", (4) "counter reset" for switching to a "counter window screen" in order to reset a counter, (5) "guard" for switching to the aforementioned "guard operation window screen" in order to operate guards which are protective shelves provided at the front face and back face of the press, (6) "mis-feed reset" for switching to a "mis-feed window screen" in order to reset after eliminating causes of mis-feeding. If the control instruction indicium "guard" is touched, the currently displayed screen will be switched to the "guard operation window screen" shown in FIG. 3 and in the enlarged view of FIG. 5, in which a "guard operation window" is overlapped on the base screen "production monitor A". The "guard operation window screen" can be switched back to the base screen "production monitor A", by touching a control instruction indicium "return".

At the lower part of the main operating panel 20, there are provided a pair of manual operation buttons 33a, 33b laterally aligned under (on a side of) the display surface of the plasma display 32, and a power supply ON/OFF switch 34 for turning the power source for the plasma display 32 etc. ON and OFF, disposed between the manual operation buttons 33a, 33b. When the touch screen display is in a normal operation mode, each time switching between screens is executed, new control instructing functions are given to the manual operation buttons 33a, 33b in accordance with control instructions for controlled objects which are displayed on the screens displayed on the display surface of the plasma display 32 and a control instruction for a controlled object displayed on the newly selected screen. For instance, when the base screen "production monitor A" (shown in FIG. 4) is displayed, if the control instruction indicium "guard" displayed thereon is touched, the "guard operation window screen" (shown in FIG. 5) will appear. This window screen displays control instruction indicia "front guard" and "rear guard", and by touching either of them, a front guard or rear guard is specified as a object to be controlled. On the window screen, there are also displayed opposite control instructions "down" and "up", according to which, new opposite control instructing functions are given to the manual operation buttons 33a and 33b. More specifically, a control instructing function "lowering" is given to the manual press button 33a that is so disposed at the left hand as to correspond to the display position of the control instruction "down", whilst a control instructing function "lifting" is given to the manual operation button 33b that is so disposed at the right hand as to correspond to the display position of the control instruction "up". Similarly, when a base screen "manual operation" (not shown) is displayed, if a control instruction indicium "MB bolster" displayed on the base screen is touched, a "moving bolster running operation window screen" appears. This window screen displays a control instruction indicium "MB clamper", and by touching it, a moving bolster clamper is specified as an object to be controlled. Then, according to opposite control instructions "clamp" and "unclamp", new opposite control instructing functions, that is, "clamping" and "unclamping" are given to the right and left manual operation buttons 33a, 33b.

An IC card reader 35 for reading data stored in various IC cards to be inserted therein is disposed at the centre of the lower part of the main operating panel 20. At the left of the IC card reader 35, there are provided a die-light ON/OFF switch 36 for turning lighting equipment for dies ON and OFF, a front safety device ON/OFF switch 37 for turning a front laser safety device ON and OFF, a rear safety device ON/OFF switch 38 for turning a rear laser safety device ON and OFF, in this order. At the right of the IC card reader 35, there are disposed a main motor turning direction selector 39 for selecting the forward/backward rotating directions of a main motor for driving the crank, a main motor starting button 40 for starting the main motor, and a main motor stop button 41 for stopping the main motor, in this order.

Figure 6:
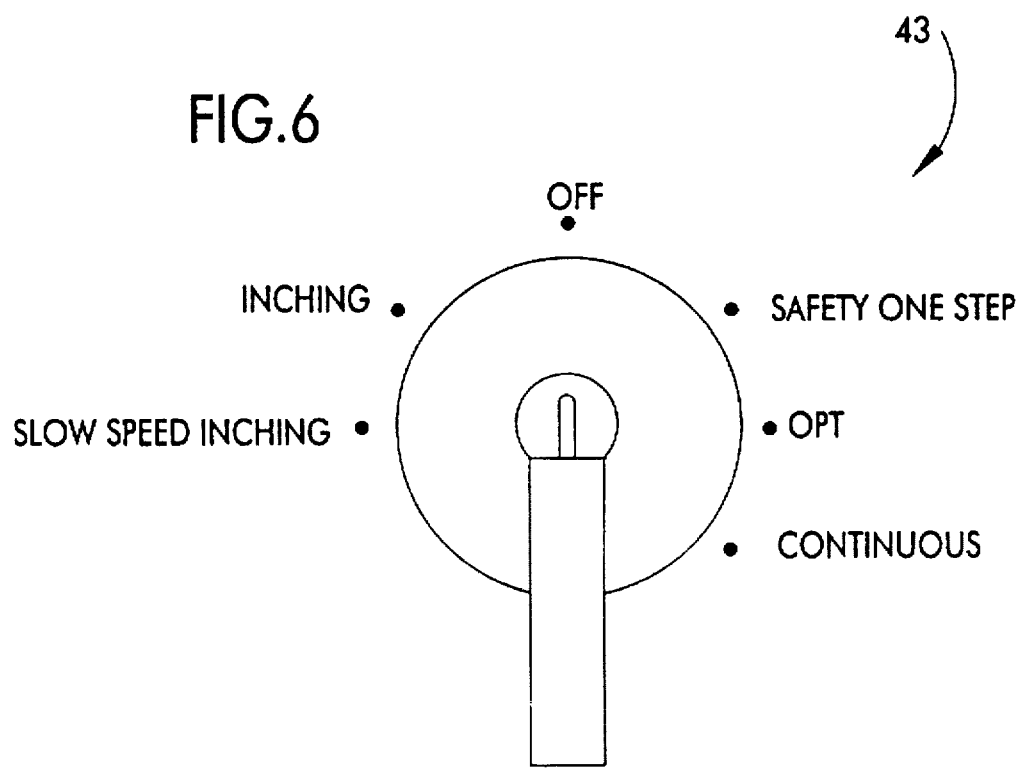

At the lower part of the main operating panel 20, there are provided, from left to right, an emergency stop button 42 for stopping the press in case of emergency, a driving-mode selector 43 for selecting the driving modes of the press when the touch screen display is in the normal operation mode, and a speaker 44 for informing the progress of control operations being performed on controlled objects in the emergency operation mode, for example, when a screen cannot be displayed on the display surface of the plasma display 32. As the driving modes selectable by the driving-mode selector 43, "slow speed inching", "inching", "off", "safety one step", "OPT" and "continuous" are provided as shown in FIG. 6 which is an enlarged front view of the driving-mode selector 43.

Figure 7:
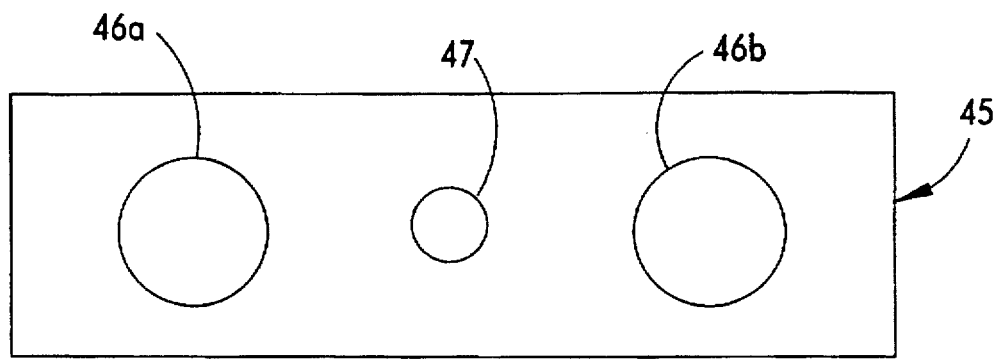

In addition to the main operating panel 20, a portable operating panel 45 as shown in FIG. 7 is provided in the press. The portable operating panel 45 is mainly used when the press is actuated and is provided with (1) a pair of manual operation buttons 46a, 46b that are turned ON by simultaneously pressing them and used for actuating the press in various driving modes selected by the driving-mode selector 43, (2) an emergency stop button 47 that is disposed between the manual operation buttons 46a, 46b and functions similarly to the emergency stop button 42 on the main operating panel 20, and (3) operation stop button (not shown) for stopping the continuous operation of the press. The driving modes selected by the driving-mode selector 43 and the operation of the press executed by simultaneous pressing of the manual operation button 46a, 46b are as follows.

"Slow Speed Inching"

During pressing of the manual operation buttons 46a, 46b, the crank moves at a slow speed and when the pressing operation is stopped, the crank also stops.

"Inching"

During pressing of the manual operation buttons 46a, 46b, the crank moves at a constant speed, and when the pressing operation is stopped, the crank also stops.

"Off"

The crank does not move even when the manual operation buttons 46a, 46b are pressed.

"Safety One Step"

When the manual operation buttons 46a, 46b are pressed, the crank inches from its upper dead point to its lower dead point, and thereafter, the crank continuously moves until the upper dear point is reached regardless of whether or not the manual operation buttons 46a, 46b are operated.

"OPT"

Option

"Continuous"

Figure 8:
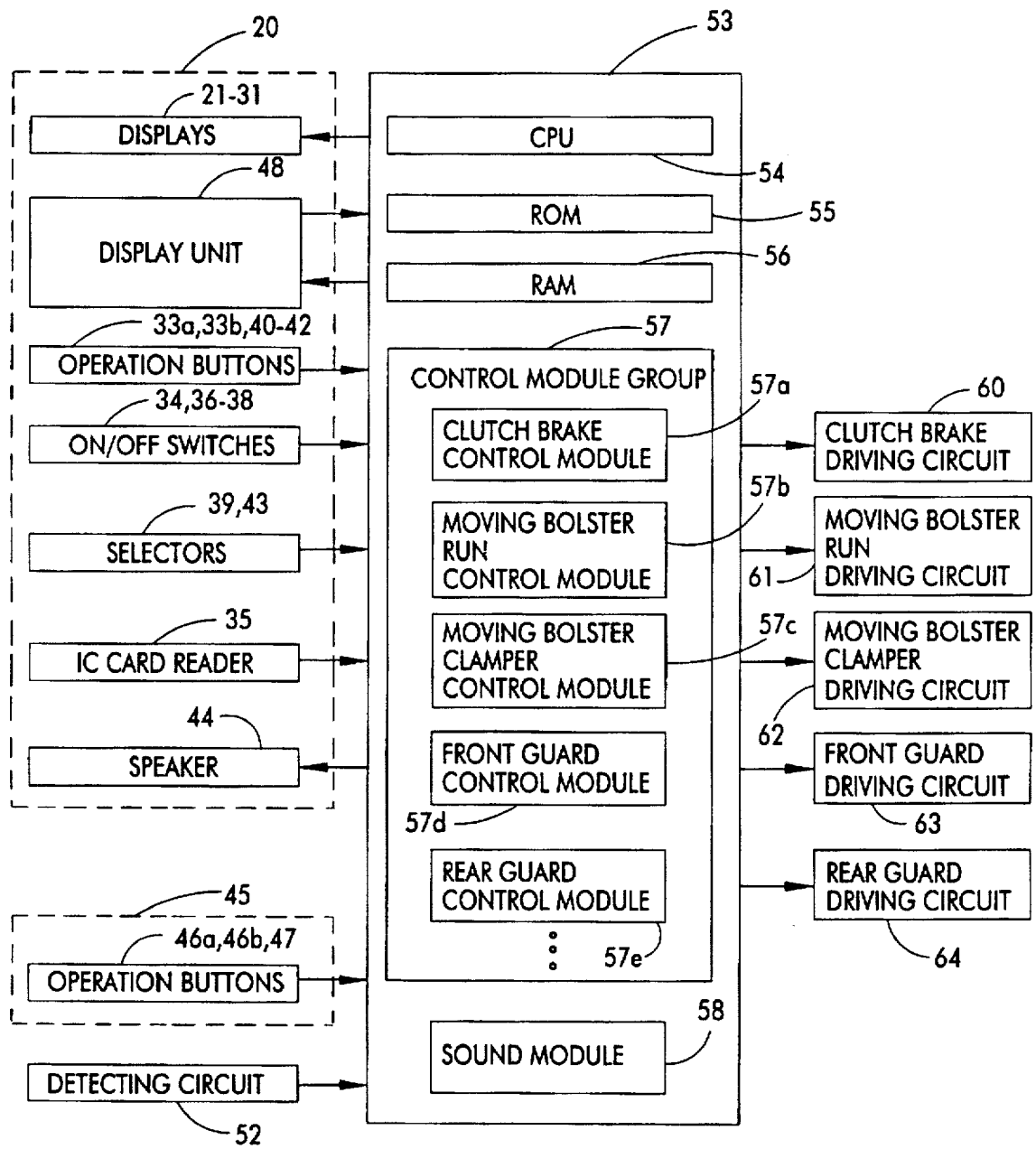

Once the manual operation buttons 46a, 46b are pressed, the crank will continuously move regardless of whether or not the manual operation buttons 46a, 46 are operated. With reference to the block diagram of FIG. 8, the outline of the whole structure of the press including the main operating panel 20 and the portable operating panel 45 will be explained. The plasma display 32 is provided in a display unit 48 incorporated in the main operating panel 20. In addition to the plasma display 32, provided in the display unit 48 are (see FIG. 9) a touch detecting circuit 49, a display control circuit 50 having a bit map memory used for displaying data on the plasma display 32, and a read only memory (ROM) 51 for storing display screen data and display code data. The display screen data are stored per screen with screen numbers allocated thereto. The display code data are stored in graphic form with code numbers allocated thereto and include numerical characters, characters and bar graphs.

The following data are supplied from the main operating panel 20 to a programmable controller 53: (i) the mesh number of a touched location that is detected in the touch detecting circuit 49 based on a touch operation performed on the touch screen of the display surface of the plasma display 32 in the display unit 48 (the mesh number is one example of a mesh identification mark allocated to each mesh region defined by the virtual mesh all over on the display surface, and a touched location is detected through the mesh number); (ii) control instructions entered by pressing the manual operation buttons 33a, 33b, the main motor starting button 40, the main motor stop button 41 and the emergency stop button 42; (iii) ON/OFF instructions entered by ON/OFF operating the power supply ON/OFF switch 34, the die-light ON/OFF switch 36, the front safety device ON/OFF switch 37 and the rear safety device ON/OFF switch 38; and (iv) selecting instructions entered by selecting operations with the main motor turning direction selector 39 and the driving-mode selector 43. The data stored in the IC card (i.e., ROM card) inserted in the IC card reader 35 are read out by the IC card reader 35 and are similarly supplied from the main operating panel 20 to the programmable controller 53. Control instructions entered by pressing the manual operation buttons 46a, 46b, the emergency stop button 47 etc. are supplied from the portable operating panel 45 to the programmable controller 53, whilst detected values such as a calculation value for the number of parts which have been processed, the number of lots which have been processed, press speed value, die height value, a loading value for the press, a crank angle value, a balancer pressure value are supplied from detecting circuits 52 to the programmable controller 53. The programmable controller 53 is comprised of (i) a central processing unit (CPU) 54 for executing a specified program, (ii) a read only memory (ROM) 55 for storing the program, filter data and display control algorithms, (iii) a random access memory (RAM) 56 in which working areas including various registers for a switch filter, a touch switch cue, a display updating cue, an [X] cue and a [Y] cue, all required for executing the program, are set, (iv) a group of control modules 57, these modules corresponding to the driving systems of the press respectively in order to control them, and (v) a sound module 58. The group of control modules 57 comprises (i) a clutch brake control module 57A for performing the speed control of the crank, (ii) a moving bolster run control module 57B for performing the running control of the moving bolster, (iii) a moving bolster clamper control module 57C for performing the clamping/unclamping control of the moving bolster, (iv) a front guard control module 57D for performing the lifting/lowering control of the front guard, (v) a rear guard control module 57E for performing the lifting/lowering control of the rear guard, and others. By executing the specified program preliminarily stored in the ROM 55, the programmable controller 53 allows the displays 21 to 31 including the LED speed display 21, the overload display 22 and the roulette type crank angle display 29 to display data, according to (i) a mesh number from the display unit 48, (ii) control instructions from the operation buttons 33a, 33b, 40, 41, 42, 46a, 46b and 47, (iii) ON/OFF instructions from the ON/OFF switches 34, 36 and 38, (iv) selecting instructions from the selectors 39 and 43, (v) the data read out by the IC card reader 35, and (vi) detected values from the detecting circuits 52. The programmable controller 53 also generates a screen command for executing switching from one screen to a specified screen and supplies it to the display control circuit 50 in the display unit 48 so that the display control circuit 50 reads display screen data etc. corresponding to the screen command from the ROM 51 and allows the plasma display 32 to display the specified screen. The programmable controller 53 selects a control module from the group of control modules 57 comprising the clutch brake control module 57A, the moving bolster run control module 57B, the moving bolster clamper control module 57C, the front guard control module 57D and the rear guard control module 57E in order to actuate a clutch brake driving circuit 60, a moving bolster run driving circuit 61, a moving bolster clamper driving circuit 62, a front guard driving circuit 63, or a rear guard driving circuit 64, so that the speed control of the crank, the running control of the moving bolster, the clamping control of the moving bolster, the lifting/lowering control of the front guard, or the lifting/lowering control of the rear guard can be performed. In the emergency operation mode such as when a screen cannot be displayed on the plasma display 32, the controller 53 controls the sound module 58 to allow the speaker 44 to inform the progress of control operations (e.g. the crank speed control, the running control, the clamping control and the lifting/lowering control) performed on the controlled objects (e.g. the crank, the moving bolster, the front and rear guards). More concretely, "ready", "operation starts", "attention", "completed" etc. are informed through the speaker 44.

Figure 9:
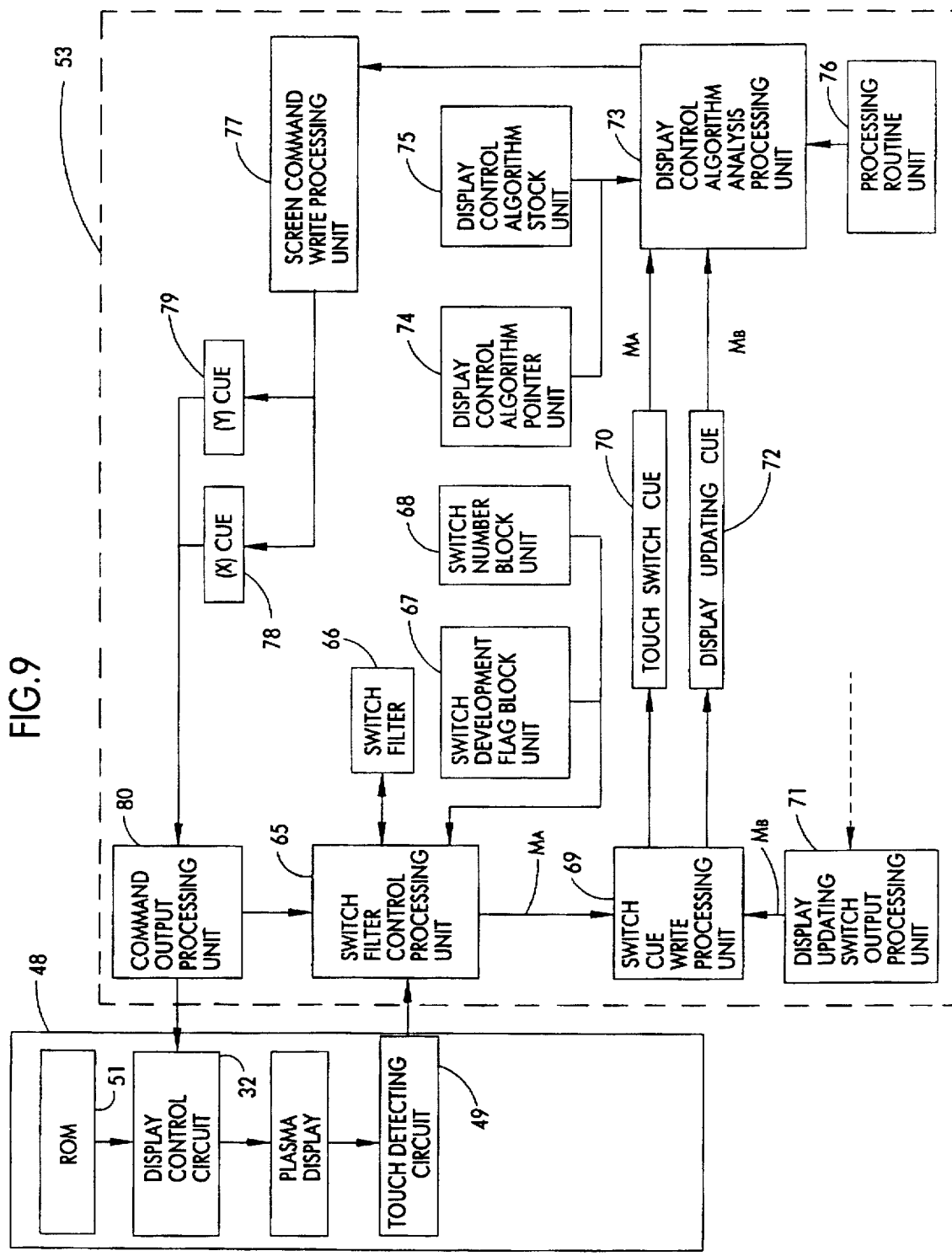

Now, reference will be made to FIG. 9 that illustrates the screen display control process performed in the display unit 48 and the programmable controller 53 in block form, for describing the screen display control wherein a screen currently displayed on the screen surface is switched to a specified screen by touching the touch screen of the display surface of the plasma display 32. In the following description, the "guard operation window screen" (see FIG. 5) in which a window is opened and overlapped on the base screen "production monitor A" will be used as an example. In FIG. 9, the CPU 54 is composed of a switch filter control processing unit 65, a switch cue write processing unit 69, a display updating switch output processing unit 71, a display control algorithm analysis processing unit 73, a screen command write processing unit 77 and a command output processing unit 80. The ROM 55 is composed of a switch development flag block unit 67, a switch number block unit 68, a display control algorithm pointer unit 74, a display control algorithm stock unit 75, and a process routine unit 76. The RAM 56 is composed of a switch filter 66, a touch switch cue 70, a display updating cue 72, an [X] cue 78 and a [Y] cue 79.

Figure 10A:
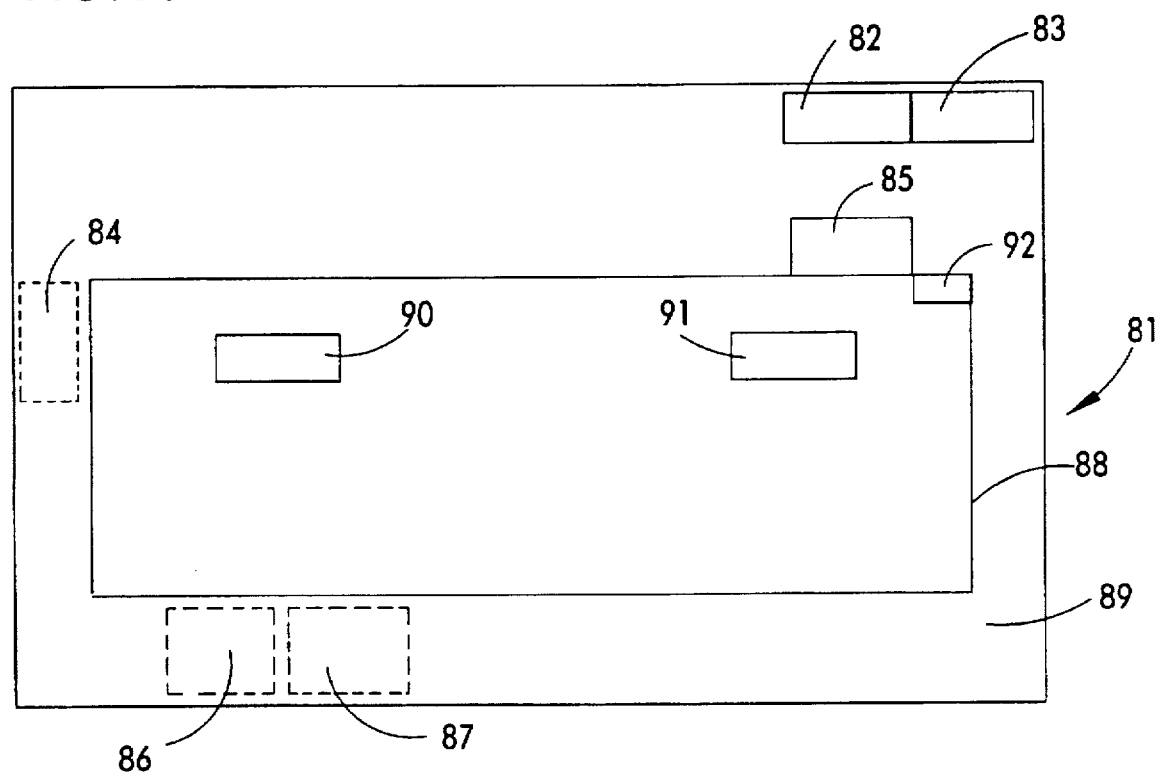
FIGS. 10(A) shows the window screen "guard operation" in which only control instruction indicia are graphically displayed.

Although the display positions of control instruction indicia are only indicated on a guard operation window screen 81 shown in FIG. 10(A), the guard operation window screen 81 actually displays "A  B", "press menu", "hand book", "counter reset" (only a part of it is displayed), "guard" and "mis-feed reset". These control instruction indicia have been explained in conjunction with the base screen "production monitor A" and are located at positions 82 to 87 which are seen over a window 88 on the screen 89. On the window 88, there are displayed control instruction indicia "front guard", "rear guard" and "return" represented by Reference Numerals 90 to 92. Each of these control instruction indicia 82–87 and 90–92 takes the form of an operation button, and has a touch switch number $M_A$ (0 is excluded) that serves as an inherent process identification mark. As shown in FIG. 10 (B), in this embodiment, the whole display surface of the plasma display 32 on which a screen is to be displayed is divided into 160 mesh regions by a 10×16 virtual mesh, and each of the 160 mesh regions has a mesh number N (1 to 160). The control instruction indicia 82–87 and 90–92 are so disposed as to correspond to some of the mesh regions. Therefore, when the screen is touched, more specifically, one of the control instruction indicia 82–87 and 90–92 on the screen is touched, the touched location is detected with the corresponding mesh number N in the touch detecting circuit 49. The mesh number N of the touched location thus detected is supplied to the switch filter control processing unit 65 in the programmable controller 53. In the switch filter control processing unit 65, the touch switch number $M_A$ corresponding to one of the control instruction indicia 82–84, 87 and 90–92 which has been touched is assigned to the mesh number N by the switch filter 66. The switch filter 66 consists of, as shown in FIG. 10(C), 160 registers $R_1$ to $R_{160}$ which are in one-to-one correspondence with the mesh regions having the mesh numbers of 1 to 160. When the guard operation window screen 81 shown in FIG. 10(A) is currently displayed, the control instruction indicia 82–84 and 87 which can be seen over the window 88 on the screen 89 (i.e., "A  B", "press menu", "hand book", and "mis-feed reset") correspond to the registers $R_4$ and $R_3$; the registers $R_2$ and $R_1$; the registers $R_{64}$ and $R_{80}$; the registers $R_{140}$, $R_{139}$, $R_{156}$ and $R_{155}$ respectively, whilst the control instruction indicia 90 to 92 on the window 88, (i.e., "front guard", "rear guard" and "return") correspond to the registers $R_{77}$ and $R_{76}$; the registers $R_{69}$ and $R_{68}$; and the register $R_{50}$ respectively. The touch switch numbers $M_A$ assigned inherently to these control instruction indicia 82–84, 87, 90–92 respectively are set in their corresponding registers and "0" is set in each of other registers. "0" means that there is no corresponding control instruction indicium. Therefore, only the control instruction indicia 82–84 and 87 which can be seen over the window 88 on the screen 89 (i.e., "A  B", "press menu", "hand book", and "mis-feed reset") and the control instruction indicia 90 to 92 on the window 88, (i.e., "front guard", "rear guard" and "return") are set on the guard operation window screen 81 as control instruction indicia to be touched. In the switch filter 66, when the mesh number N detected corresponds to other locations than those of the above control instruction indicia 82–84, 87, 90–92, the mesh number N is invalidated, and when the mesh number N detected corresponds to the location of any of the above control instruction indicia 82–84, 87, 97–92, the mesh number N is validated and the touch switch number $M_A$ corresponding to the control instruction indicia 82–84, 87, 90–92 which has been touched is assigned to the mesh number N.

It is understood from the above description that, on the guard operation window screen 81, if the control instruction indicia 85 and 86 which can be seen over the window 88 on the screen 89 are touched, the touch switch number $M_A$ will not be assigned to the mesh number N in the switch filter control processing unit 65, and only when any one of the control instruction indicia 82–84 and 87 which can be seen over the window 88 on the screen 89 and the control instruction indicia 90–92 on the window 88 is touched, the touch switch number $M_A$ is assigned to the mesh number N in the switch filter control processing unit 65. It should be, therefore, noted that as far as the guard operation window screen 81 is concerned, only the control instruction indicia 82–84 and 87 which can be seen over the window 88 on the screen 89 and the control instruction indicia 90 to 92 on the screen 88 are actual control instruction indicia to be used for touch operation, and the control instruction indicia 85 and 86 which can be seen over the window 88 on the screen 89 are not the actual control instruction indicia to be used.

The filter data in the switch filter 66 consist of a switch development flag block and switch number blocks as explanatorily shown in FIGS. 11(A) and 11(B) (though only one switch number block is shown in FIG. 11(B)). In FIGS. 11(A), 11(B), the above blocks for one screen (this screen could be a base screen or a window screen) to be displayed on the display surface of the plasma display 32 are shown. Each time switching between screens is executed, the switch development flag block and the switch number blocks corresponding to a newly displayed screen are read out through the switch filter control processing unit 65 from the switch development flag block unit 67 and the switch number block unit 68, and then supplied to the respective registers $R_1$ to $R_{160}$ in the switch filter 66, whereby a switch filter for a currently displayed screen on the display surface of the plasma display 32 is formed.

Next, the above switch development flag block and the switch number block will be described in detail.

As has been described above, every screen to be displayed has its corresponding switch development flag block. The switch development flag block for one screen has 160 switch development flags that correspond to the registers $R_1$ to $R_{160}$ of the switch filter 66. Basically, the switch development flag is set to "0", invalidating its corresponding mesh number N when the mesh number N corresponds to other locations than those of the above-described actually valid control instruction indicia, and is set to "1", validating the mesh number N when it corresponds to any one of the actually valid control instruction indicia. However, each of the control instruction indicia takes the form of an operation button and it has four switch patterns as shown in FIGS. 12(A) to 12(D). Each pattern has one mesh region regarded as a reference position (this mesh region is hatched in FIGS. 12(A) to 12(D)) and when a control instruction indicium corresponds to several switch development flags, only the switch development flag corresponding to the reference position of the switch pattern is set to "1". For example, in the case of the guard operation window screen 81, the control instruction indicium 92 "return" is represented in the switch pattern of FIG. 12(A), the control instruction indicium 84 "hand book" is the switch pattern of FIG. 12(B), the control instruction indicia 82, 83, 90, 91

( "A  B",

"press menu", "front guard" and "rear guard") are the switch pattern of FIG. 12(C) and the control instruction indicium 87 "mis-feed reset" is the switch pattern of FIG. 12(D). Therefore, only the switch development flags hatched in FIG. 11(A) are set to "1". Accordingly, the switch number block as shown in FIG. 11(B) is arranged for each of the operation instruction indicia 82–84, 87, 90–92, and in each switch number block, the switch pattern and the touch switch number $M_A$ are set in accordance with the switch development flag set to "1". Therefore, one screen has one switch development flag block and switch number blocks the number of which is the same as that of the control instruction indicia displayed on the screen. With the switch development flag block and the switch number blocks, the above-described switch filter is formed.

The touch switch number $M_A$ which has been assigned to the mesh number N in the switch filter control processing unit 65 is sent to the switch cue write processing unit 69 and then written to the touch switch cue 70 that is a first-in first-out type memory. If there is any change in a detected values such as a calculation value for the number of parts which have been processed, the number of lots which have been processed and die height value which are detected by the detecting circuits 52 and displayed on the screen, a display update switch number $M_B$ will be assigned to the changed detected value in the display updating switch output processing unit 71, without operation by the operator. The number $M_B$ is an individual inherent processing identification mark similar to the touch switch number $M_A$ and could be any number except for "0" that does not overlap with the touch switch number $M_A$. The display update switch number $M_B$ thus assigned is sent to the switch cue write processing unit 69 and then written to the display updating cue 72 that is a similarly first-in first-out type memory.

The touch switch number $M_A$ and the display update switch number $M_B$ which have been written to the touch switch cue 70 and the display updating cue 72 respectively are sequentially read out by the display control algorithm analysis processing unit 73. In the display control algorithm analysis processing unit 73, display control algorithms corresponding to the touch switch number $M_A$ and the display update switch number $M_B$ are read out from the display control algorithm stock unit 75 through the display control algorithm pointer unit 74 for controlling display control algorithms, by the use of the head pointer addresses of the display control algorithms corresponding to the switch numbers $M_A$ and $M_B$.

Now there will be given a detailed explanation on the above-mentioned display control algorithm, the display control algorithm pointer unit 74 and the display control algorithm stock unit 75.

Figure 13:
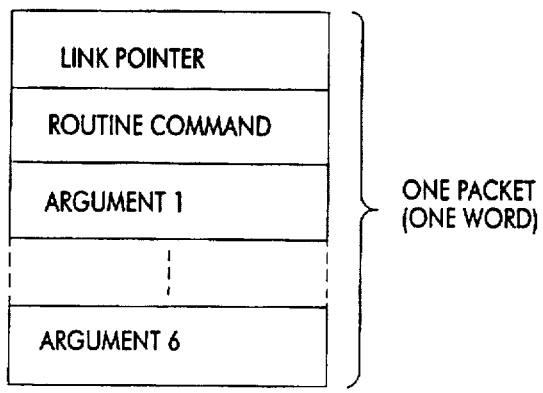

The display control algorithm is an algorithm of display processes corresponding to the switch numbers $M_A$ or $M_B$ and is comprised of a group of packets each of which has a specified arrangement of data as shown in FIG. 13. Each packet is composed of 8 words in total, specifically, a link pointer (one word) for showing the leading address of a packet to be processed after completion of processing of one packet; a routine command (one word) for selecting one routine to be used from a group of processing routines including a four-rule calculation routine, data transmission routine, display screen switching control routine, display numerical-character output routine, display character output routine, display bar graph output routine etc.; and arguments 1 to 6 (each has one word) each representing a parameter to be passed to the processing routine. In the display control algorithm corresponding to the switch number $M_A$ or $M_B$, the link pointer when there is no packet to be linked, that is, the link pointer of the last packet is "0".

Figure 14:
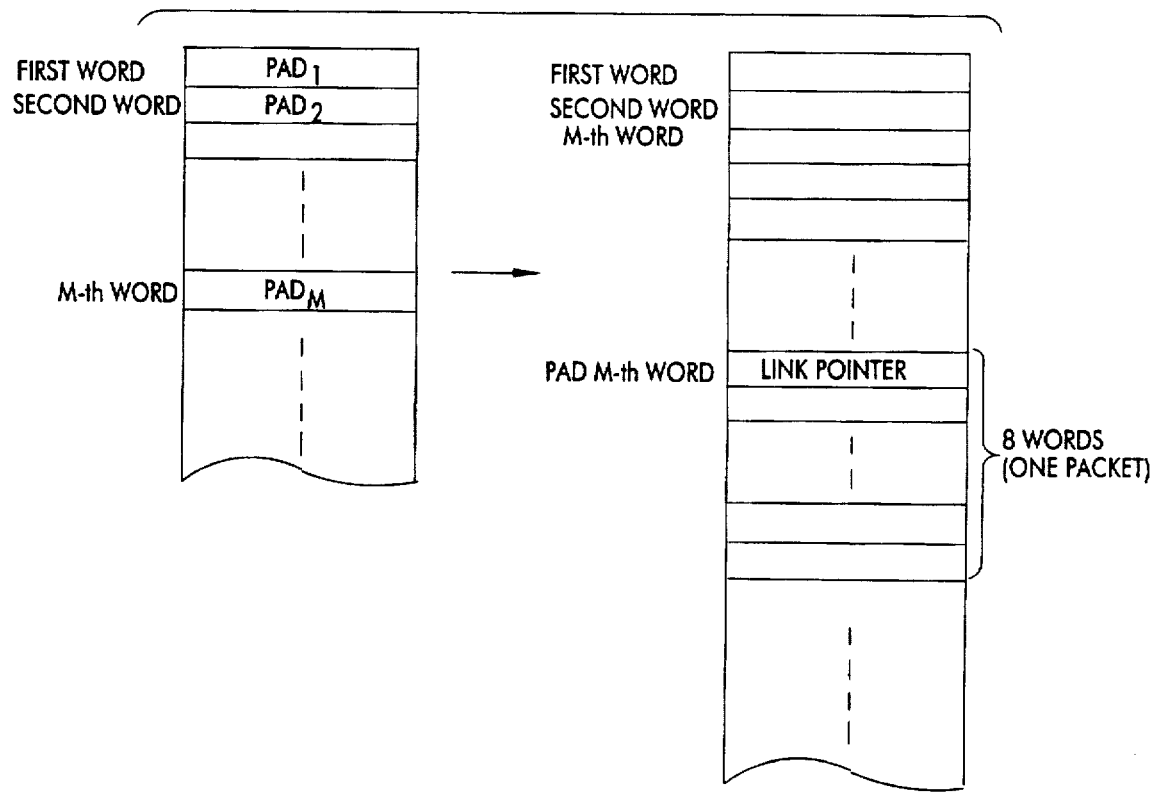

The display control algorithms comprised of the above packet groups and corresponding to the switch numbers $M_A$ and $M_B$ are stored in the display control algorithm stock unit 75. The number of the stored display control algorithms equals to the total number of touch switch numbers $M_A$ and display update switch numbers $M_B$. The pointer addresses of the display control algorithms stored in the display control algorithm stock unit 75 are stored in the display control algorithm pointer unit 74 with such an arrangement that the pointer address corresponding to the switch number 1 comes to the top and then the pointer addresses each corresponding to $M_A$ or $M_B$ are arranged in order so that one pointer address corresponds to one word. For example, when the display control algorithm for executing a process corresponding to a switch number M is read out from the display control algorithm stock unit 75 (see FIG. 14), the M-th word counted from the leading end of the display control algorithm pointer unit 74 is checked and a pointer address $PAD_M$ corresponding to the switch number M is obtained. Then, 8 words of data are read out from the address $PAD_M$ in the display control algorithm stock unit 75 based on the pointer address $PAD_M$, thereby obtaining the first packet of the display control algorithm corresponding to the switch number M. In the case where the display control algorithm corresponding to the switch number M is comprised of a plurality of packets, all the packets of the display control algorithm can be read out by sequentially linking the packets by the use of the link pointer of the first packet. These display control algorithms are prepared by a stand-alone external device and written in the display control algorithm stock unit 75, which facilitates the alteration of the display control algorithms.

In the display control algorithm analysis processing unit 73, an arithmetic operation is performed on the display control algorithm read out by the processing unit 73 according to processing routines which are sequentially read out from the group of processing routines stored in the processing routine unit 76 in compliance with routine commands of the above packets. Then, the display control algorithm allows to generate a screen command for instructing displaying of a screen to the display unit 48. When displaying of a screen is instructed, the screen command includes a screen number for indicating the location of new display screen data corresponding to the screen displayed, in the ROM 51. When updating of display code data such as numerical characters, characters, bar graphs etc. is instructed, the screen command includes a display position of new display code on the screen as well as a code number for indicating the locations of the new display code data corresponding to the display code displayed in the ROM 51. Of the screen commands thus generated, the screen command based on the touch switch number $M_A$ instructs switching of screens, with high processing priority, and is written to the [X] cue 78 that is a first-in first-out memory through the screen command write processing unit 77. On the other hand, the screen command based on the display update switch number $M_B$ instructs updating of numerical characters, characters, bar graphs, or similar data, with low processing priority, and is written to the [Y] cue 79 that is also a first-in first-out memory through the screen command write processing unit 77. In a case where a screen command is sequentially written to the [X] cue 78 when another screen command is being written to the [Y] cue 79, the latter will be cleared. This is because when one screen is switched to another, updating of numerical characters, characters, bar graphs etc. on the original screen is no longer necessary.

The screen commands thus written to the [X] cue 78 and the [Y] cue 79 are sequentially read out by the command output processing unit 80 and supplied to the display control circuit 50 in the display unit 48 of the main operating panel 20. Upon receipt of the screen commands, the display control circuit 50 reads specified display screen data and display code data, according to the screen number and code number included in the screen commands, from the ROM 51 wherein display screen data for each screen and display code data (including numerical characters, characters, bar graphs etc.) in the form of graphic data are stored, and allows to display the screen data and display code data on the display surface of the plasma display 32. Regarding the display code data, the data are displayed according to the display position included in the screen command. When the screen "production monitor A" (see FIG. 4) is displayed on the display surface of the plasma display 32 for example, the calculation value of the number of parts which have been processed= "1,800", the number of lots which have been processed= "999", preset value="1,000", die height value="823.4", loading value for the press="150" and press speed value graphically indicated are the parts to be updated by the screen command based on the display update switch number $M_B$. Other factors are displayed based on the screen command based on the touch switch number $M_A$. The screen command read out from the [X] cue 78 by the command output processing unit 80 is supplied to the switch filter control processing unit 65 and a switch filter for a currently displayed screen on the display surface of the plasma display 32 is formed in the switch filter 66.

Finally, the emergency control to be performed in a case where a trouble occurs in the plasma display 32 and a screen cannot be displayed on its display surface will be described with reference to FIGS. 15 to 18.

When a screen cannot be displayed on the display surface of the plasma display 32, either of two kinds of emergency operation cards I and II prepared, which are IC cards, is inserted in the IC card reader 35. This allows the normal operation mode, in which a control instruction is sent to controlled objects in the press based on a touch on the touch screen of the display surface of the plasma display 32, to be switched to the emergency operation mode. In the emergency operation mode, functions different from those in the normal operation mode are given to the LED speed display 21 and the driving-mode selector 43 so that without a touch on the display surface of the plasma display 32 and displaying of a screen on the display surface, a control instruction can be supplied to a specified controlled object in the press. There are control instructions for controlled objects such as "die height adjustment", "upper clamper", "guard", "bar connecter", "die cushion", "bar lift", "moving bolster clamper" and "moving bolster run". Such instructions are stored in the two kinds of emergency operation cards I and II. In other displays than the LED speed display 21 (i.e., the displays 22 to 31) and other switches than the driving-mode selector 43 (i.e., the operation buttons 33a, 33b, 40–42, 46a, 46b, 47, the ON/OFF switches 34, 36–38, and the main motor turning direction selector 39), the same functions as those in the normal operation mode are maintained when the emergency operation mode is selected.

Figure 15:
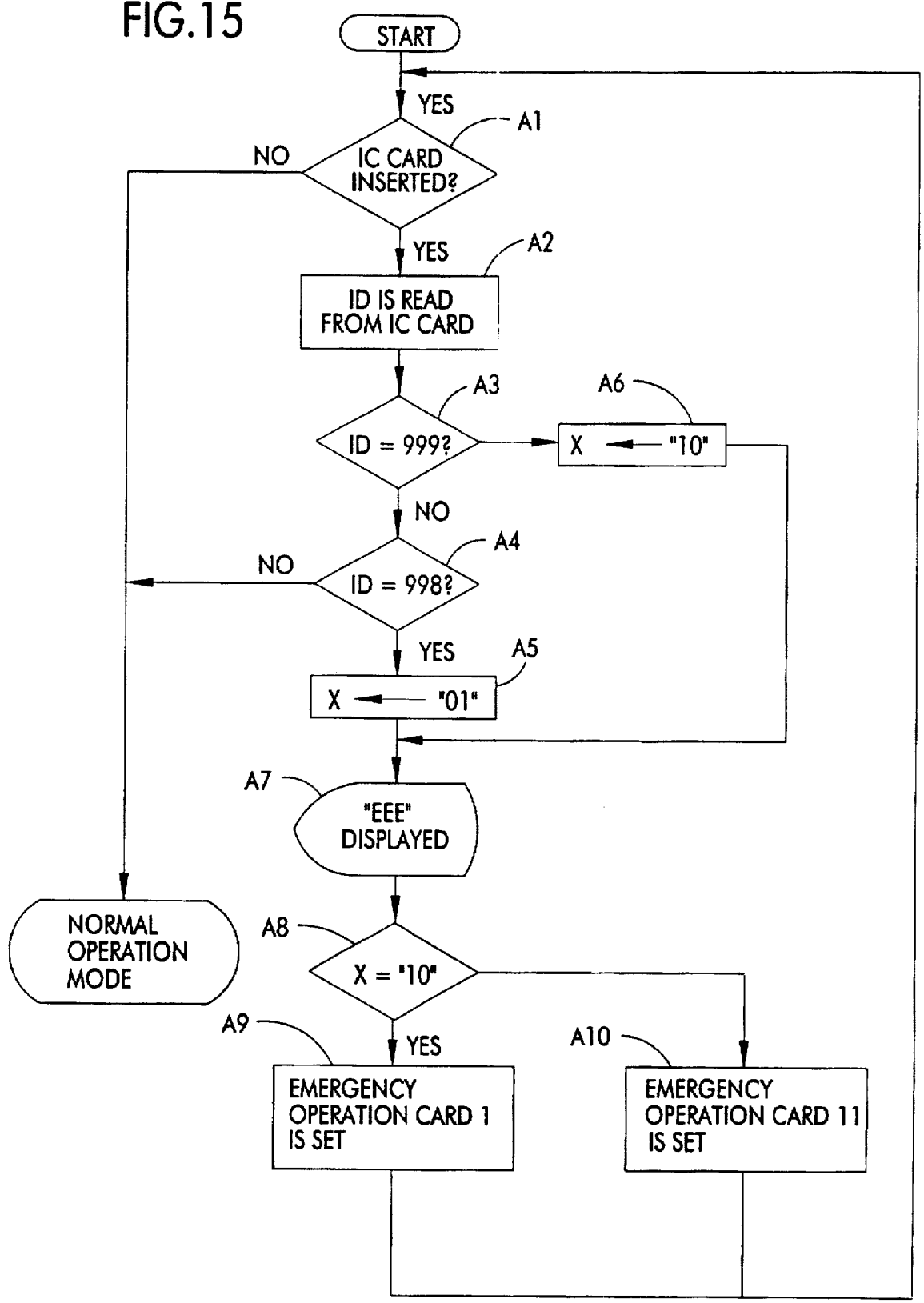

Next, with reference to the flow chart of FIG. 15, the emergency operation mode switching control for switching from the normal operation mode to the emergency operation mode will be described. Suppose that ID "999" and ID "998" are stored in the emergency operation cards I and II respectively and these cards are IC cards.

A-1: It is checked whether or not an IC card is inserted in the IC card reader 35, and if not, the processes of the normal operation mode will be performed.

A-2: If it is judged at the check of Step A-1 that an IC card is inserted in the IC card reader 35, the ID stored in the IC card will be read.

A-3: It is checked whether or not the ID read from the IC card is "999". If the ID is "999", the inserted IC card will be identified as the emergency operation card I, and the program will proceed to Step A-6.

A-4: If it is judged at Step A-3 that the ID is not "999", it will be checked whether or not the ID is "998". If the ID is not "998", it will be judged that the inserted IC card is neither the emergency operation card I nor II. Then, the processes of the normal operation mode will be executed.

A-5: If it is judged at the check of Step A-4 that the ID is "998", the IC card will be identified as the emergency operation card II. Then, "01" is set in a flag register X for indicating the emergency operation mode. "01" set in the flag register X means that the mode has been switched to the emergency operation mode by the emergency operation card II.

A-6: if it is judged at the check of Step A-3 that the ID is "999", the IC card will be identified as the emergency operation card I. Then, "10" will be set in the flag register X for indicating the emergency operation mode. "10" set in the flag register X means that the mode has been switched to the emergency operation mode by the emergency operation card I.

A-7: The LED speed display 21 displays "EEE" which means that the press is in the emergency operation mode.

A-8: It is checked whether or not "10" is set in the flag register X, and if not, the program will proceed to Step A-10.

A-9: If it is judged at the check of Step A-8 that "10" is set in the flag register X, control instructions for controlled objects according to the emergency operation card I will be set in the driving-mode selector 43 as shown in FIG. 16(A).

"die height adjustment"

The height of the die is adjusted by lifting or lowering the die.

"upper clamper"

The upper clamper used for securing the upper die to the slide is clamped or unclamped.

"guard"

The front and rear guards, which are protective shelves provided at the front and rear faces of the press, are lowered or lifted at the same time.

"bar connecter"

The transfer bar is connected or disconnected.

"die cushion"

The die cushion pad serving as a cushion for the die is lifted or lowered.

"bar lift"

The transfer bar for the die is lifted or lowered.

A-10: If it is judged at the check of Step A-8 that "10" is not set in the flag register X, control instructions for controlled objects according to the emergency operation card II will be set in the driving-mode selector 43 as shown in FIG. 16(B).

"MB clamper"

The moving bolster clamper for securing the moving bolster within the press is clamped or unclamped.

"guard"

The above-mentioned front and rear guards are lifted or lowered at the same time.

"die cushion"

The above-mentioned die cushion pad is lifted or lowered.

"MB run"

The moving bolster is run rightward or leftward.

Figure 17A:
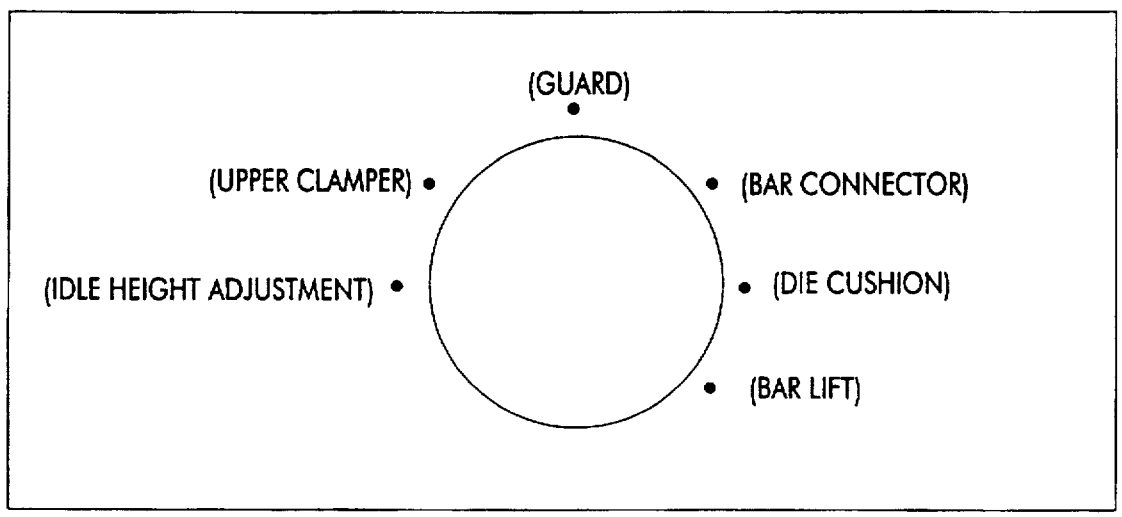
FIGS. 17(A) and 17(B) are front views of name plates hung on the driving-mode selector, such name plates being used when the emergency operation mode is set by the emergency operation cards I, II.
Figure 17B:
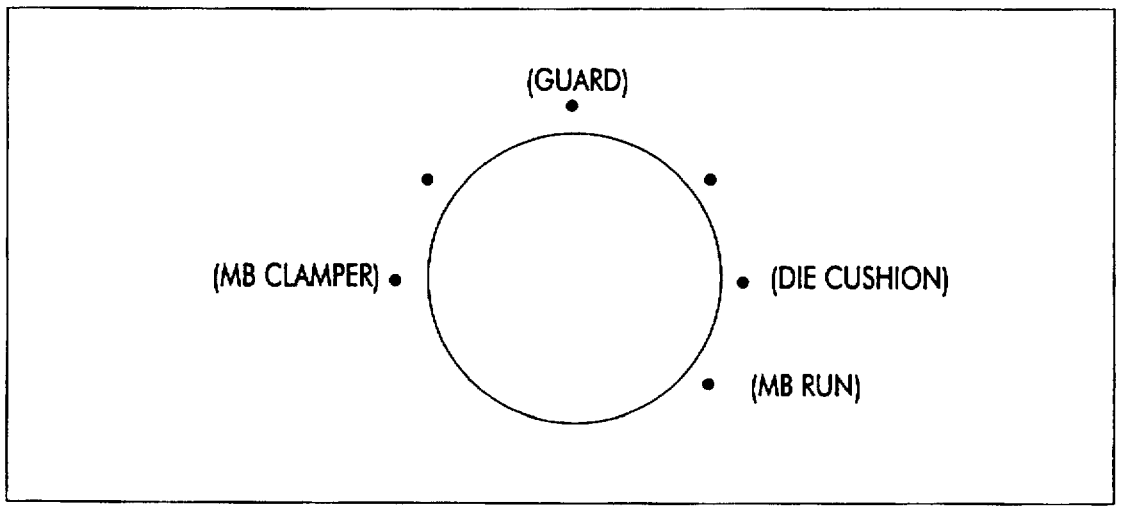

As has been described above, one of 8 kinds of control instructions for controlled objects which have been set in the driving-mode selector 43 is selected by operating the driving-mode selector 43 in combination with either of the operation cards I, II, whereby control instructing functions corresponding to the selected control instruction for a specified controlled object can be given to the laterally disposed pair of manual operation buttons 33a, 33b. For example, if the control instruction "die height adjustment" is selected by operating the driving-mode selector 43 when the emergency operation card I is inserted, the control instructing function for lowering the die is given to the left manual operation button 33a and the control instructing function for lifting the die is given to the right manual operation button 33b. Thus, in the same way, according to a control instruction for a specified controlled object selected by operating the driving-mode selector 43, one of control instructing functions "clamping of the upper clamper", "lowering of the guards", "connecting of the transfer bar", "lowering of the die cushion", "lowering of the transfer bar", "clamping of the moving bolster clamper" and "left running of the moving bolster" is given to the left manual operation button 33a, whilst one of control instructing functions "unclamping of the upper clamper", "lifting of the guards", "disconnecting of the transfer bar", "lifting of the die cushion", "lifting of the transfer bar", "unclamping of the moving bolster clamper" and "right running of the moving bolster" is given to the right manual operation button 33b. In the emergency operation mode, name plates shown in FIGS. 17(A) and 17(B) are hung on the driving-mode selector 43 so that control instructions for controlled objects which have been set in the driving-mode selector 43 can be visually identified.

With reference to the flow chart of FIG. 18, the operation process in the emergency operation mode will be explained below by way of an example where control instructions for controlled objects as shown in FIG. 16(B) are set in the driving-mode selector 43 by inserting the emergency operation card II and the control instruction "MB run" is selected by operating the driving-mode selector 43 for giving the functions "the right running/left running of the moving bolster" to the buttons 33a, 33b.

B-1: It is checked whether or not the running interlock for the moving bolster is released, and if not, the program proceeds to Step B-6.

B-2: If it is judged at the check of Step B-1 that the running interlock for the moving bolster is released, the speaker 44 will inform "Ready".

B-3: When the control instruction "MB run" has been selected by the driving-mode selector 43, the control instructing function for running the moving bolster leftward is given to the left manual operation button 33a and the control instructing function for running it rightward is given to the right manual operation button 33b. Thus, a wait time elapses until either of the manual operation buttons 33a, 33b is pressed. If the left manual operation button 33a is pressed for example, the speaker 44 will inform "Operation starts".

B-4: A wait time elapses until a moving bolster run magnet button (not shown) is pressed and when pressed, the speaker 44 informs "Attention" and the moving bolster starts its left running.

B-5: At the time the moving bolster reaches the left end, the speaker 44 informs "Completed" and the moving bolster is stopped.

B-6: The running interlock for the moving bolster is released.

The following table shows the procedure for die replacement that is performed by a combination of operations such are inserting/non-inserting of the emergency operation cards I, II in the IC card reader 35, and selecting one of control instructions for controlled objects that have been set in the driving-mode selector 43 by the emergency operation cards I or II.

Die Replacement Procedure

| step | operation | control instruction or driving mode selected by driving-mode selector | emergency operation card |
|---|---|---|---|
| 1 | die height is adjusted | die height adjustment | I |
| 2 | the die cushion pad is lowered | die cushion | I |
| 3 | the slide is lowered by moving the crank so that the upper/lower dies are engaged | inching | no |
| 4 | the upper die is removed from the slide | upper clamper | I |
| 5 | the slide is lifted by moving the crank | inching | no |
| 6 | the transfer bar is released | bar connecter | I |
| 7 | the moving bolster secured in the press is unclamped | MB clamper | II |
| 8 | the front and rear guards in the press are lifted | guard | II |
| 9 | the die is taken out from the press and the next die is put in the press by running the moving bolster | MB run | II |
| 10 | the front and rear guards in the press are lowered | guard | II |
| 11 | the moving bolster is clamped and secured in the press | MB clamper | II |

-continued

Die Replacement Procedure

| step | operation | control instruction or driving mode selected by driving-mode selector | emergency operation card |
|---|---|---|---|
| 12 | the transfer bar is connected | bar connecter | I |
| 13 | die height is adjusted | die height adjustment | I |
| 14 | the slide is lowered by moving the crank | inching | no |
| 15 | the upper die is secured to the slide | upper clamper | I |
| 16 | the slide is lifted by moving the crank | inching | no |
| 17 | die height is adjusted | die height adjustment | I |
| 18 | the die cushion pad is lifted | die cushion | I |

Although the mesh number N is supplied from the display unit 48 to the programmable controller 53 in the foregoing embodiment, alternative arrangements may be possible. For example, the display unit 48 is provided with the switch filter 66, the switch development flag block unit 67 and the switch number block unit 68, and the switch number M that has been assigned to the mesh number N in the display unit 48 is supplied to the programmable controller 53, whereby the amount of information transmitted between the display unit 48 and the programmable controller 53 can be reduced.

Although the mesh number N is used as the mesh identification mark in the embodiment, such a mark could be an alphabetical code or any other mark that can identify the mesh region touched. Also, the process identification mark needs not necessarily be the switch number M and could be an alphabet or any other mark that can identify the contents of a process selected, more particularly, the display control algorithm to be processed.

Although there are provided a pair of manual operation buttons 33a, 33b laterally disposed to which opposite control instructing functions for a specified controlled object are given in the embodiment, control instructing functions for a specified controlled object could be given to either of the manual operation buttons 33a, 33b. It is also possible that instead of the manual operation buttons 33a, 33b, one manual operation selector is used in order to switch between the opposite control instructing functions.

Further, in the embodiment, the speaker 44 informs by sound the progress of a control performed on a controlled object when the emergency operation mode is set because the plasma display 32 fails to display a screen on its display surface. However, it is also possible that the status could be visually informed by the LED display or other displays. In stead of the plasma display 32, an LCD display or CRT display etc. may be used.

Although the driving-mode selector 43 of the rotary type is particularly described in the embodiment, a push button type driving-mode selector comprised of a plurality of push buttons may be used. Further, the normal operation mode is switched to the emergency operation mode by inserting the emergency operation card I or II in the IC card reader 35 in the embodiment, but the switching may be executed by the use of a manual operation switch for emergency operation. The control instructions for controlled objects set in the driving-mode selector 43 when the emergency operation mode is selected may be stored in the ROM provided in the main operating panel 20, or alternatively stored in the emergency operation cards I and II. The ROM 51 in the display unit 48 may be ROM cards such as IC cards.

The invention being thus described, it may be obvious that the same may be varied in many ways. It will be understood by those skilled in the art that such variations and modifications are not to be regarded as a departure from the spirit and scope of the invention and are all included in the scope of the appended claims.

What is claimed is:

1. A touch screen display comprising:

(a) displaying means comprising a display surface selectively displaying screens and having a touch screen divided into mesh regions defined by a virtual mesh, each of said selectively displayed screens having at least one control instruction indicium by which a screen currently displayed is switched to another specified screen, said control instruction indicium being so arranged to correspond to the mesh regions defined by the virtual mesh on the display surface;

(b) a first memory means for storing display screen data for each of the screens to be selectively displayed on the display surface of the displaying means;

(c) touched location detecting means for detecting a touched location specified by a touch on the touch screen of the display surface of the displaying means, and for indicating a mesh identification mark allocated to the mesh region corresponding to the touched location;

(d) second memory means for storing filter data for each of the selectable screens to be displayed on the display surface of the displaying means;

(e) third memory means for storing display control algorithms each corresponding to each process identification mark that is to be assigned in accordance with the filter data for each screen and is stored in the second memory means;

(f) process identification mark assigning means for assigning a process identification mark to the validated mesh identification mark which has been detected by the touched location detecting means as a function of the filter data corresponding to a screen currently displayed on the display surface of the displaying means and stored in the second memory means;

said process means using said filter data for invalidating and eliminating the processing of the mesh identification mark detected by the touched location detecting means when it corresponds to a location other than the location of the control instruction indicium respectively displayed on each selectable screen on the display surface of the displaying means, or said process means using said filter data for validating and processing the mesh identification mark when it corresponds to the location of the control instruction indicium, said process means using said filter data to assign a process identification mark of the corresponding control instruction indicium to the validated mesh identification mark;

(g) screen command generating means for generating a screen command for instructing displaying of a specified screen, by processing the display control algorithm that corresponds to the process identification mark assigned by the process identification mark assigning means and is stored in the third memory means; and (h) display control means for displaying a specified screen on the display surface of the displaying means according to the display screen data corresponding to the specified screen and stored in the first memory means, in response to the screen command generated by the screen command generating means whereby the response time of the touch screen display is shortened because the filter data eliminates processing by the process means of invalid mesh identification marks which are detected by the touched location detecting means.

2. The touch screen display as claimed in claim 1, wherein the display means, the first memory means, the touched location detecting means and the display control means are located at a display section, wherein the second memory means, the third memory means, the process identification mark assigning means and the screen command generating means are located at a control section, and wherein the mesh identification marks and the screen commands are transmitted between the display section and the control section whereby the response time of the touch screen display is shortened because the amount of information transmitted between the display section and the control section is reduced.

3. The touch screen display as claimed in claim 1, wherein the displaying means, the first memory means, the touched location detecting means, the second memory means, the process identification mark assigning means and the display control means are located at a display section, wherein the third memory means and the screen command generating means are located at a control section, and wherein the process identification marks and the screen commands are transmitted between the display section and the control section whereby the response time of the touch screen display is shortened because the amount of information transmitted between the display section and the control section is reduced.

4. The touch screen display as claimed in claim 1, wherein the screen is a base screen or a window screen comprising at least one window overlapped on the base screen.

5. The touch screen display as claimed in claim 1, wherein the mesh identification mark is a mesh number allocated to each of the mesh regions defined by the virtual mesh on the entire display surface.

6. The touch screen display as claimed in claim 5, wherein the virtual mesh for dividing the entire display surface is n×m and the mesh numbers range from 1 to n×m, where n and m are integers.

7. The touch screen display as claimed in claim 5, wherein the process identification mark is a switch number allocated to each of the control instruction indicia which take the form of operation buttons.

8. The touch screen display as claimed in claim 7, wherein the filter data for each screen comprises a switch development flag block and a switch number block.

9. The touch screen display as claimed in claim 8, wherein a switch development flag in the switch development flag block is basically set to "0" for invalidating its corresponding mesh number when the mesh number corresponds to an other location than the location of the control instruction indicium and to "1" for validating its mesh number when the mesh number corresponds to the location of the control instruction indicium.

10. The touch screen display as claimed in claim 1, wherein the display control algorithms are prepared by an external device and stored in the third memory means.

11. The touch screen display as claimed in claim 1 wherein the displaying means comprises a plasma display, an LCD display or CRT display.

12. The touch screen display as claimed in claim 1, wherein the displaying means comprises a plasma display, an LCD display or CRT display, and the screen is a base screen or a window screen comprising at least one window overlapped on the base screen.

13. The touch screen display as claimed in claim 1, wherein the first memory means comprises a ROM cases including an IC card.

14. The touch screen display as claimed in 1 that is adapted to a press for use.

15. A touch screen display for operating a controlled object, said display comprising:
(a) displaying means comprising a display surface composed of a touch screen on which screens can be selectively displayed, wherein in a normal operating mode switching from one screen to another specified screen is executed by touching the touch screen of the display surface and wherein said displaying means may have an abnormal condition so that a screen cannot be displayed on the display surface;
(b) at least one control instruction switching means disposed on a side of the display surface of the displaying means, to which a new control instructing function is given each time one screen is switched to another, in accordance with the controlled object displayed on the new screen on the display surface;
(c) emergency operation mode switching means responsive to the displaying means for switching from the normal operation mode to an emergency operation mode at least when the displaying means is in the abnormal condition such that a screen cannot be displayed on the display surface; and
(d) controlled object selector switching means responsive to the emergency operation mode switching means for assigning a particular control instructing function to the control instruction switching means in the event that the mode switching means switches from the normal operation mode to the emergency operation mode as a result of the display means being in the abnormal condition, the particular control instructing function corresponding to one of the control instructions for the controlled object which are set when the mode operating switch switches from the normal operating mode to the emergency operating mode.

16. The touch screen display as claimed in claim 15, further comprising informing means for informing the progress of control operation being performed on a controlled object visually and/or by means of sound when switching to the emergency operation mode has taken place and the control operation is started by the control instruction switching means at least in a case where the displaying means is in said abnormal condition.

17. The touch screen display as claimed in claim 15, wherein two control instruction switching means are employed and opposite control instructing functions for a specified controlled object are given to the two control instruction switching means.

18. The touch screen display as claimed in claim 17, wherein said opposite control instructing functions for a specified controlled object are lifting/lowering control instructing functions or clamping/unclamping control instructing functions.

19. The touch screen display as claimed in claim 17, wherein the two control instruction switching means are two manual operation buttons that are disposed in lateral alignment on a side of the display surface of the displaying means.

20. The touch screen display as claimed in claim 19, wherein according to the opposite control instructing functions for a specified controlled object given to the two manual operation buttons, opposite control instructions are displayed, in corresponding locations to the manual operation buttons, on a screen displayed on the display surface of the displaying means.

21. The touch screen display as claimed in claim 15, wherein switching from the normal operation mode to the emergency operation mode by the emergency operation mode switching means is executed by inserting an emergency operation card in the touch screen display.

22. The touch screen display as claimed in claim 21, wherein the emergency operation card stores control instructions for controlled objects, which are to be set in the selector switching means.

23. The touch screen display as claimed in claim 22, wherein a plurality of kinds of emergency operation cards are used for setting different control instructions for controlled objects in the selector switching means.

24. The touch screen display as claimed in claim 22, wherein the emergency operation card is a ROM card including an IC card.

25. The touch screen display as claimed in claim 15, wherein the selector switching means is capable of selecting various driving modes when the touch screen display is in the normal operation mode.

26. The touch screen display as claimed in claim 15, wherein the selector switching means is a selector.

27. The touch screen display as claimed in claim 25, wherein the selector switching means is a driving mode selector when the touch screen display is in the normal operation mode.

28. The touch screen display as claimed in claim 15 wherein the touch screen display is adapted to control a press.

* * * * *

UNITED STATES PATENT AND TRADEMARK OFFICE
CERTIFICATE OF CORRECTION

PATENT NO. : 5,717,433
DATED : February 10, 1998
INVENTOR(S) : Eiji Doba

It is certified that error appears in the above-identified patent and that said Letters Patent is hereby corrected as shown below:

Claim 1, column 20, lines 45-58 should read as follows:

--means and stored in the second memory means, said process identification mark assigning means including:
    (1) means, responsive to said filter data stored in the second memory means, for invalidating and eliminating the processing of the mesh identification mark detected by the touched location detecting means when it corresponds to a location other than the location of the control instruction indicium respectively displayed on each selectable screen on the display surface of the displaying means;
    (2) means, responsive to said filter data stored in the second memory means, for validating and processing the mesh identification mark when it corresponds to the location of the control instruction indicium; and
    (3) means, responsive to said filter data stored in the second memory means, for assigning a process identification mark of the corresponding control instruction indi- --

Signed and Sealed this

Twelfth Day of May, 1998

Attest:

BRUCE LEHMAN

Attesting Officer

Commissioner of Patents and Trademarks